United States Patent
Pal et al.

(10) Patent No.: US 12,549,535 B2
(45) Date of Patent: Feb. 10, 2026

(54) SYSTEMS AND METHODS FOR A LEAD PORTAL WITH UNIFIED LOGIN FOR CHILD APPLICATIONS IN A TIERED SOFTWARE FRAMEWORK

(71) Applicant: HighLevel Inc., Dallas, TX (US)

(72) Inventors: Nilasish Pal, Asansol (IN); Shivam Tiwari, Toronto (CA); Sayeed Mohammed, Ambur (IN); Malde Chavda, Rajkot (IN); Vishnu Srikanth, Tiruchirappalli (IN); Prathamesh Mhatre, Mumbai (IN); Shaun Clark, Eugene, OR (US); Robin Alex, Dallas, TX (US); Varun Vairavan, Doha (QA)

(73) Assignee: HighLevel Inc.

( * ) Notice: Subject to any disclaimer, the term of this patent is extended or adjusted under 35 U.S.C. 154(b) by 176 days.

(21) Appl. No.: 18/515,750

(22) Filed: Nov. 21, 2023

(65) Prior Publication Data

US 2025/0168156 A1    May 22, 2025

(51) Int. Cl.
*H04L 9/40* (2022.01)
(52) U.S. Cl.
CPC ........ *H04L 63/0815* (2013.01); *H04L 63/105* (2013.01)

(58) Field of Classification Search
CPC ..... H04L 63/10; H04L 63/101; H04L 63/102; H04L 63/104; H04L 63/105
See application file for complete search history.

(56) References Cited

U.S. PATENT DOCUMENTS

| | | | | |
|---|---|---|---|---|
| 2007/0094543 | A1* | 4/2007 | Joshi | G06F 11/3688 714/38.14 |
| 2007/0214497 | A1* | 9/2007 | Montgomery | G06F 21/6218 726/4 |
| 2017/0272449 | A1* | 9/2017 | Gilpin | G06F 9/468 |

\* cited by examiner

Primary Examiner — Jahangir Kabir
(74) Attorney, Agent, or Firm — Aambell PC

(57) ABSTRACT

Embodiments of a method for a lead portal with unified login for child applications in a tiered software framework include receiving a login credential at a lead portal displayed in a frontend of a parent application; and displaying a subset of child applications selected from a plurality of child applications on the lead portal, the subset being selected based on the login credential. The parent application comprises the tiered software framework having a first tier, a second tier and a third tier arranged according to hierarchical data access. The child applications are to use resources except data common across multiple tiers at a backend of the parent application. The child applications are to use data specific to the third tier. The login credential is of a lead associated with the third tier, and different login credentials are associated with correspondingly different subsets of the child applications.

20 Claims, 10 Drawing Sheets

SYSTEMS AND METHODS FOR A LEAD PORTAL WITH UNIFIED LOGIN FOR CHILD APPLICATIONS IN A TIERED SOFTWARE FRAMEWORK

TECHNICAL FIELD

The present disclosure relates to systems, techniques, and methods directed to systems and methods for a lead portal with unified login for child applications in a tiered software framework.

BACKGROUND

Cloud computing services include storage, network, and computing, facilitating various service models, such as infrastructure as a service (IaaS), platform as a service (PaaS) and software as a service (Saas). Software applications running on the cloud are being increasingly used to support various business operations, including marketing. In this regard, some SaaS applications focus on lead management, which is the process of acquiring and managing leads (i.e., potential customers) until they make a purchase. The process can include targeting of specific customers and/or building individual relationships with customers. Lead management can include lead generation to identify a customer, customer inquiry to assess customer interest, identity capture to understand the customer, inquiry filtering to verify customer information, lead grading to filter customers based on their estimated value to the business, lead distribution to fan out potential customers for targeted sales, sales contact to engage with individual customers, lead nurturing to enable the individual customers to respond favorably to the sales contact, and sales, when the lead management comes to an end.

BRIEF DESCRIPTION OF THE DRAWINGS

Embodiments will be readily understood by the following detailed description in conjunction with the accompanying drawings. To facilitate this description, like reference numerals designate like elements. Embodiments are illustrated by way of example, and not by way of limitation, in the figures of the accompanying drawings.

DETAILED DESCRIPTION

Overview

Figure 1:
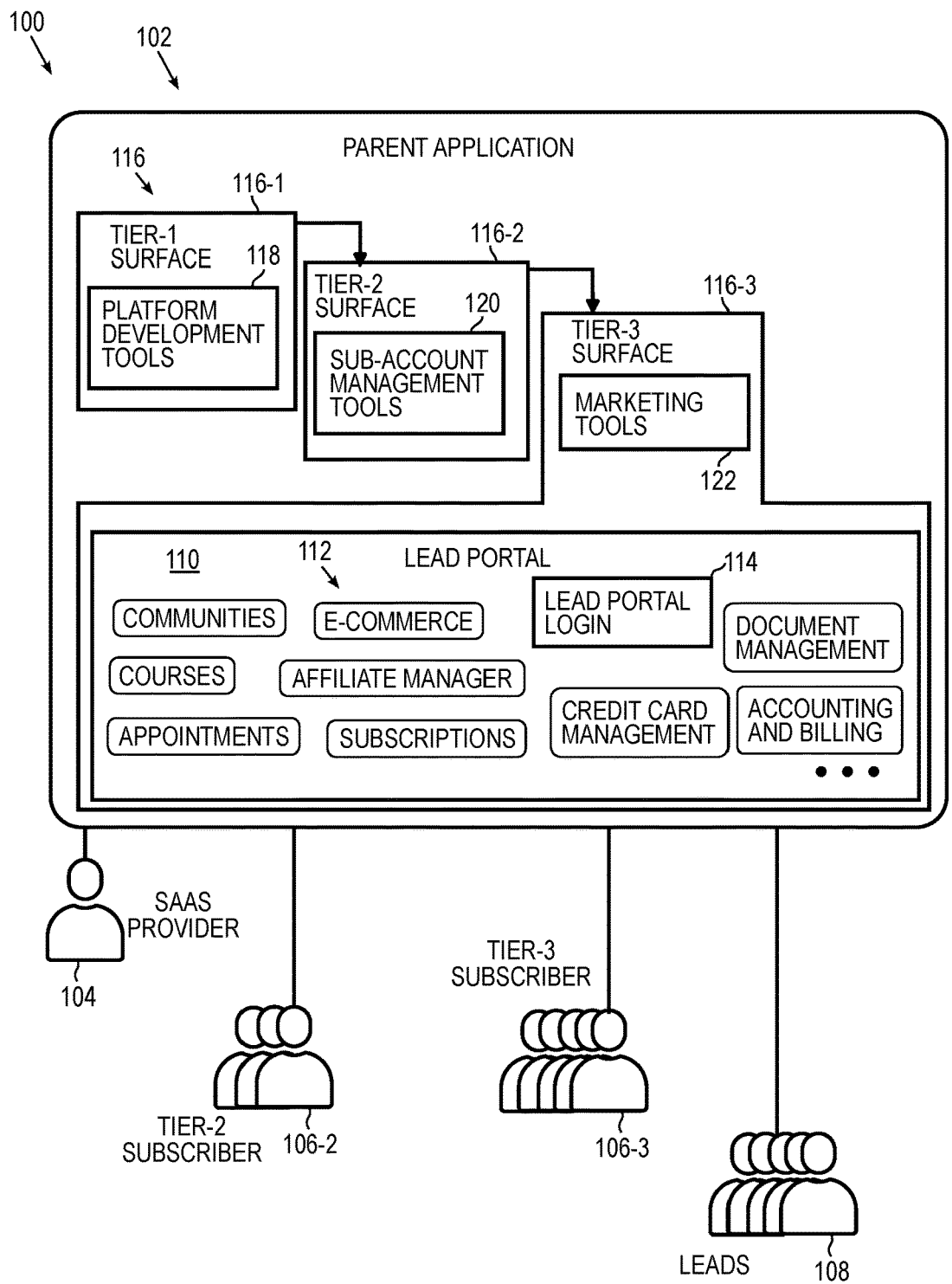
FIG. 1 is a simplified block diagram illustrating an example system for a lead portal with unified login for child applications in a tiered software framework, according to some embodiments of the present disclosure.

For purposes of illustrating the embodiments described herein, it is important to understand certain terminology and operations of technology networks. The following foundational information may be viewed as a basis from which the present disclosure may be properly explained. Such information is offered for purposes of explanation only and, accordingly, should not be construed in any way to limit the broad scope of the present disclosure and its potential applications.

Currently, lead management applications available in the market are fragmented, with different vendors providing various types of capabilities tailored to specific aspects of lead management. For example, Salesforce™, Zoho™ Customer Relationship Management (CRM), Agile™ CRM, etc. provide software that allow businesses to capture leads, track their interactions and automate lead nurturing processes. Pipedrive™ allows businesses to track leads and prioritize them. Marketo™ enables automated marketing campaigns with tracking to quantify lead engagement. Lead-Squared™ provides features such as lead scoring, automated lead nurturing and lead tracking. Yet, none of these solutions are tailored to the specific business that has purchased the software; in other words, a plumbing business may have the same lead management tools available to it as a dentist's office.

In addition, businesses are unable to perform end-to-end lead management through such software, forcing them to use multiple vendors for different functions. For example, a dentist's office may want a customized web portal that allows its dental customers to schedule appointments on a web portal, provide information about specific dental issues; enable a community of others looking for answers to common dental problems; etc. A plumber's business on the other hand, may want to establish a hotline where customers can call in with emergency plumbing needs and get an appointment scheduled via the phone or modify scheduled appointments on a web portal; a set of courses to enable homeowners to tackle simple plumbing issues; an e-commerce shop to sell plumbing parts; and so on. Currently, lead management software does not accommodate such varying needs and instead provides the same repertoire of capabilities (e.g., functionalities) across many businesses. Thus, the dentist's office must engage with a lead management software for managing leads as well as a web developer to design a custom website tailored to the dentist's business, whereas the plumbing business must engage with a presumably different web developer to design a different custom website tailored to the particular plumbing business.

In general, managing leads can be a complex and time-consuming process, particularly for small and medium-sized enterprises (SMEs) that have limited resources. To this end, embodiments disclosed herein enable a lead portal that provides a unified login for many child applications, for example, to simplify the lead management process and improve efficiency. The lead portal can provide enhanced SME control, including custom branding (e.g., white labeling). The lead portal can be hosted on a custom domain specific to the customer, while also being compatible with best practices for search engine optimization (SEO). Various embodiments bridge the gap between SME and lead communications and empower SMEs to have more control over the fragmented contact set.

In various embodiments, the lead portal comprises a central dashboard and multiple child applications, including community groups, affiliate campaigns, invoices, and courses for leads. As used herein, the "child application" refers to a software application that is subordinate to or dependent on another primary or "parent application." The child application works in conjunction with the parent application, providing supplementary functionalities that extend or enhance the capabilities of the main software system. The child application relies on the parent application for certain resources, data, or functionalities, and it may not function independently without the parent application. The child applications promote modularity and extensibility, allowing developers to add or remove specific functionalities without significantly altering the core functionality of the parent application.

In various embodiments, the central dashboard provides a single login for many such child applications, allowing users to access many lead management functions from a single location. The system includes customizable branding options, allowing SMEs to brand the lead portal with their own logo and colors. Additionally, the lead portal can use a custom domain, allowing SMEs to use their own domain name instead of a generic uniform resource locator (URL). This can help SMEs to establish their own brand identity and improve their online presence.

The lead portal may operate as a centralized platform for managing leads. In some embodiments, a tier-1 user may be a default user of the client portal. In some other embodiments, tier-3 subscribers (through suitable administrators) can enable different entitlements for different child applications. In some embodiments, substantially all child applications provide lead management functions. In other embodiments, the child applications may be tailored for different functions apart from lead management. Examples of lead management functions include Community Groups that allow SMEs to create and manage online communities of potential customers, Affiliate Campaigns that allow SMEs to create and manage affiliate marketing campaigns, Invoices application that allows SMEs to create and manage invoices for their leads, Courses application that allow SMEs to create and manage online courses for their leads; and so on. In some embodiments, each such child application can provide a targeted benefit to the tier-3 SME. For example, the Community Groups application can help SMEs to engage with their target audience and build relationships with potential leads; the Affiliate Campaigns can help SMEs to leverage marketing efforts of others to generate leads and increase sales; the Invoices application can help SMEs to streamline their billing process and improve cash flow; the Courses application can help SMEs to provide value to their target audience and establish themselves as experts in their field; and so on.

The lead portal can be used by businesses of various sizes to manage their leads more efficiently. SMEs can use the lead portal to streamline their lead management process and save time; improve their online visibility and attract more leads; customize the lead portal to meet their specific needs; establish their own brand identity and improve their online presence; provide value to their target audience and establish themselves as experts in their field. The lead portal also serves as a playground to upsell or cross-sell services and products. The SME can also choose the lead portal as a communication channel to communicate with the leads directly inside the portal or make bulk announcements about new offerings.

Leads (i.e., portal customers) can use the lead portal in various ways. For example, if an SME has created an online community for their potential customers using the Community Groups application, leads can join the community and participate in discussions, ask questions, and interact with other members. This can help them to learn more about the SME and their products or services and may eventually lead to a sale. In another example, if an SME has created an affiliate marketing campaign using the Affiliate Campaigns application, leads may see many of their current active campaign and payouts. In yet another example, if an SME has created an online course for their potential customers using the Courses application, leads can enroll in the course and learn using the lead portal. In general, leads may interact with the lead portal directly through the various applications that SMEs use to manage their leads. The goal of the lead portal is to provide SMEs with a comprehensive solution for lead management that can help them to engage with potential customers and convert leads into sales.

In various embodiments, the lead portal provides a single login for many child applications, making it easier and more convenient for users to access many lead management functions from a single location. The lead portal can be customized with the SME's branding and can use a custom domain name. The lead portal may be configured to be search engine friendly, which can help SMEs to improve their online visibility and attract more leads. The lead portal also allows SMEs to communicate with leads inside the app and run promotions.

The lead portal can provide a comprehensive solution for lead management, with multiple applications that cover different aspects of lead management, including community building, affiliate marketing, invoicing, and online courses. This makes it a one-stop-shop for SMEs looking to manage their leads more efficiently. The lead portal can be customized with the SME's branding and can use a custom domain name. This can help SMEs to establish their own brand identity and improve their online presence, which can be a key competitive advantage in a crowded marketplace. The lead portal may be designed to be search engine friendly, which can help SMEs to improve their online visibility and attract more leads. This can be a competitive advantage for SMEs looking to stand out in search engine results pages. The lead portal provides a single login for many child applications, making it easier and more convenient for users to access many lead management functions from a single location. This can be a competitive advantage for SMEs looking to save time and simplify their lead management process. The lead portal allows SMEs to have more control over their lead management process, which can be a competitive advantage for SMEs looking to differentiate themselves from their competitors.

In the following detailed description, various aspects of the illustrative implementations may be described using terms commonly employed by those skilled in the art to convey the substance of their work to others skilled in the art.

The term "connected" means a direct connection (which may be one or more of a communication, mechanical, and/or electrical connection) between the things that are connected, without any intermediary devices, while the term "coupled" means either a direct connection between the things that are connected, or an indirect connection through one or more passive or active intermediary devices.

The term "computing device" means a server, a desktop computer, a laptop computer, a smartphone, or any device with a microprocessor, such as a central processing unit (CPU), general processing unit (GPU), or other such electronic component capable of executing processes of a software algorithm (such as a software program, code, application, macro, etc.).

The term "cloud network" means a network of computing devices coupled together in a public, private, or hybrid communications network. Communication in the cloud network may use one or more wired, wireless, broadband, radio, and other kinds of communicative means. The Internet is an example of a cloud network.

As used herein, the term "application" can be inclusive of an executable file comprising instructions that can be understood and processed on a computing device such as a computer, and may further include library modules loaded during execution, object files, system files, hardware logic, software logic, or any other executable modules. Applications are generally configured to perform particular tasks, or functions according to the type of application.

The description uses the phrases "in an embodiment" or "in embodiments," which may each refer to one or more of the same or different embodiments.

Although certain elements may be referred to in the singular herein, such elements may include multiple sub-elements. For example, "a computing device" may include one or more computing devices.

Unless otherwise specified, the use of the ordinal adjectives "first," "second," and "third," etc., to describe a common object, merely indicate that different instances of like objects are being referred to and are not intended to imply that the objects so described must be in a given sequence, either temporally, spatially, in ranking or in any other manner.

In the following detailed description, reference is made to the accompanying drawings that form a part hereof, and in which is shown, by way of illustration, embodiments that may be practiced. It is to be understood that other embodiments may be utilized, and structural or logical changes may be made without departing from the scope of the present disclosure. Therefore, the following detailed description is not to be taken in a limiting sense.

The accompanying drawings are not necessarily drawn to scale. In the drawings, same reference numerals refer to the same or analogous elements shown so that, unless stated otherwise, explanations of an element with a given reference numeral provided in context of one of the drawings are applicable to other drawings where element with the same reference numerals may be illustrated. Further, the singular and plural forms of the labels may be used with reference numerals to denote a single one and multiple ones respectively of the same or analogous type, species, or class of element.

Note that in the figures, various components are shown as aligned, adjacent, or physically proximate merely for ease of illustration; in actuality, some or all of them may be spatially distant from each other. In addition, there may be other components, such as routers, switches, antennas, communication devices, etc. in the networks disclosed that are not shown in the figures to prevent cluttering. Systems and networks described herein may include, in addition to the elements described, other components and services, including network management and access software, connectivity services, routing services, firewall services, load balancing services, content delivery networks, virtual private networks, etc. Further, the figures are intended to show relative arrangements of the components within their systems, and, in general, such systems may include other components that are not illustrated (e.g., various electronic components related to communications functionality, electrical connectivity, etc.).

In the drawings, a particular number and arrangement of structures and components are presented for illustrative purposes and any desired number or arrangement of such structures and components may be present in various embodiments. Further, unless otherwise specified, the structures shown in the figures may take any suitable form or shape according to various design considerations, manufacturing processes, and other criteria beyond the scope of the present disclosure.

Figure 11:
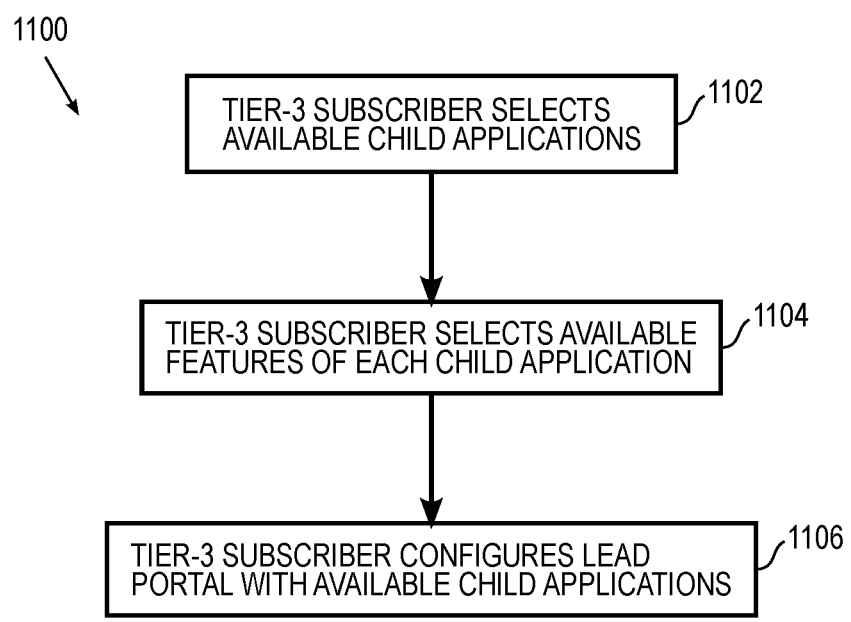
FIG. 11 is a simplified flow diagram illustrating other example operations associated with methods for a lead portal with unified login for child applications in a tiered software framework, according to some embodiments of the present disclosure.

For convenience, if a collection of drawings designated with different letters are present (e.g., FIGS. 11A-11G), such a collection may be referred to herein without the letters (e.g., as "FIG. 11"). Similarly, if a collection of reference numerals designated with different letters are present (e.g., 106a, 106b), such a collection may be referred to herein without the letters (e.g., as "106") and individual ones in the collection may be referred to herein with the letters. Further, labels in upper case in the figures (e.g., 106A) may be written using lower case in the description herein (e.g., 106a) and should be construed as referring to the same elements.

Various operations may be described as multiple discrete actions or operations in turn in a manner that is most helpful in understanding the claimed subject matter. However, the order of description should not be construed as to imply that these operations are necessarily order dependent. In particular, these operations may not be performed in the order of presentation. Operations described may be performed in a different order from the described embodiment. Various additional operations may be performed, and/or described operations may be omitted in additional embodiments.

Example Embodiments

FIG. 1 is a simplified block diagram illustrating an example parent application 100 of a system for a lead portal with unified login for child applications, according to some embodiments of the present disclosure. In the example embodiment shown, parent application 100 has three tiers 102, namely, 102-1, 102-2, and 102-3. Note that the labeling convention followed herein uses the hyphen followed by a number to denote a separate tier corresponding to the number (e.g., "-1" denotes tier-1, "-2" denotes tier-2, and "-3" denotes tier-3). Parent application 100 may be managed by a SaaS provider 104, who may provide one or more downstream subscriber 106-2 at tier 102-2 with access to parent application 100. In turn, subscriber 106-2 may provide one or more downstream subscriber 106-3 at tier 102-3 with access to certain functionalities of parent application 100. SaaS provider 104 and subscribers 106 (e.g., 106-2 and 106-3) may include an entity (i.e., a company, an organization, etc.) in various embodiments. Human users at SaaS provider 104, and subscribers 106 may operate or otherwise use parent application 100 through one or more devices.

In various embodiments, a single one of SaaS provider 104 may have multiple subscribers 106-2 at tier 102-2; a single one of subscribers 106-2 at tier 102-2 may have multiple subscribers 106-3 at tier 102-3. Subscribers 106-2 may have accounts with SaaS provider 104 at tier 102-1; subscribers 106-3 may have accounts with subscribers 106-2 at tier 102-2. In various embodiments, SaaS provider 104 may bill subscribers 106-2; subscribers 106-2 in turn may bill subscribers 106-3. The billing at each tier 102 may be based on a variety of factors that may or may not be independent of each other, including application resources used by subscribers 106, number of individual users authorized by subscribers 106 to access parent application 100, and other such factors beyond the scope of the present disclosure.

Each tier-3 subscriber 106-3 may target leads 108. Leads 108 are potential customers, current customers, or returning customers of tier-3 subscribers 106-3. Leads 108 may comprise individuals, or companies (that act through individuals). Parent application 100 enables one or more lead portals 110 that permit access to a plurality of child applications 112 through a unified lead portal login 114. Examples of child applications 112 include communities, e-commerce, courses, appointments, credit card management, document management, accounting and billing, and affiliate manager, among others. The various child applications 112 may be provided on a particular lead portal 110 according to settings and selections by respective tier-3 subscriber 106-3. Lead portal 110 may comprise a web-interface that provides users, such as leads 108 with a single point of access to various resources, information, and services of parent application 100 including child applications 112. Lead portal 110 may function as a gateway aggregating and organizing child applications 112 inside a single user interface, allowing leads 108 to access and interact with child applications 112 from a centralized location.

Child applications 112 are subordinate to or dependent on parent application 100, particularly, data and functionalities exposed at tier 102-3. In an example embodiment, child applications 112 provide supplementary functionalities related to lead management that extend or enhance the capabilities of parent application 100. Child applications 112 may not function independently outside parent application 100; in other words, child applications 112 are not stand-alone applications in relation to parent application 100 but are nevertheless independent of each other in that each child application 112 may be for a purpose different from other child applications 112 within the overarching purpose of parent application 100 (i.e., child applications 112 are for mutually different purposes).

To a user of lead portal 110, such as lead 108 or subscriber 106, each child application 112 may appear to be a stand-alone application based on characteristics of surface 116 presented. As used herein, the term "surface" refers to visible and interactive components of a user interface (UI), representing the area or space where users can interact with the software application, including elements such as buttons, menus, forms, and other graphical user interface (GUI) components. The surface encompasses the visual layout and design that users, such as leads 108 or subscribers 106 directly engage with when using parent application 100. Each surface 116 further comprises one or more user experience (UX) flows for corresponding UIs. For example, surface 116-1 associated with tier 102-1 may comprise platform development tools 118 that allow SaaS provider 104 to develop parent application 100. Surface 116-2 associated with tier 102-2 may comprise sub-account management tools 120 that allow tier-2 subscribers 106-2 to manage respective sub-accounts of tier-3 subscribers 106-3. Surface 116-3 may have, in addition to lead portal 110, other elements such as marketing tools 122.

Although lead portal 110 may present a stand-alone appearance on surface 116-3, it consumes data and services of parent application 100 behind the scenes to enable its various functionalities. Further, lead portal 110 may share data available across tiers 102, as well as data specific to individual tier 102-3. By at least such characteristics, lead portal 110 differs from stand-alone applications independent of parent application 100 that may provide similar functionalities. Further, the plurality of child applications 112 available for selection on parent application 100 may not be available with typical stand-alone applications. The various child applications 112 may be displayed in a single interface, allowing leads 108 to move from one child application 112 to another without having to separately login to different platforms.

In various embodiments, during operation, a login credential may be received at lead portal 110. In response, parent application 100 may cause to be displayed on lead portal 110, within surface 106-3, a subset of child applications 112 selected from the plurality of child applications 112. The subset may be selected based on the login credential, which may be of lead 108 associated with tier-3 subscriber 106-3. Different login credentials may be associated with correspondingly different subsets of child applications 112. In some embodiments, different tier-3 subscribers 106-3 may be associated with correspondingly different subsets of child applications 112, and different leads 108 of a common tier-3 subscriber 106-3 may be associated with the same subset of child applications 112.

For example, consider lead portal 110a comprising child application 112a of an e-commerce site selling generic consumer products. The e-commerce site may be owned (e.g., controlled, operated, etc.) by a particular one of subscribers 106-3, say 106-3a. Subscriber 106-3a may activate certain features in child application 112a, for example, shopping cart, reviews, buy buttons, product listing, images, etc. specific to the e-commerce site's market category of generic consumer products. "Features" as used herein refer to UI elements with particular functionalities. For example, a clickable button that enables a user to add an item to a shopping cart is a feature. Another subscriber 106-3b may operate another e-commerce site selling books through lead portal 110b. Lead portal 110b may display child application 112a of another e-commerce site with a shopping cart, reviews, buy buttons, product listing, images, etc. just as lead portal 110a, sharing in such resources (e.g., UI images, etc.) and/or functionalities available in parent application 100. However, even though lead portals 110a and 110b may share the same or similar features, data available and used by child application 112a in lead portal 110a differs from data available and used by child application 112b in lead portal 110b based on settings provided by respective tier-3 subscribers 106-3a and 106-3b. For example, data used in child application 112a relates to generic consumer products, whereas data used in child application 112b relates to books.

In addition, subscriber 106-3b may configure another child application 112b on lead portal 110b to enable leads 108 (i.e., consumers of lead portal 110b) to join a community of book lovers. Such a characteristic may be unavailable in typical e-commerce sites, so that users of such typical e-commerce sites have to login separately into another platform or interface to access a community of book lovers. Turning back to the embodiments herein, yet another subscriber 106-3c may operate another lead portal 110c having child application 112b tailored to a community of real estate buyers. Data available and used by child application 112b in lead portal 110b differs from data available and used by child application 112b in lead portal 110c based on settings provided by respective tier-3 subscribers 106-3b and 106-3c. For example, the data used by child application 112b on lead portal 110b may comprise information on books, authors, book-signing events, etc., whereas the data used by child application 112b on lead portal 110c may comprise maps, real-estate listings, new buyer information, etc. In addition, features in child application 112b in lead portal 110b may be different from those in child application 112c based on data and settings provided by respective tier-3 subscribers 106-3b and 106-3c. For example, videos may be disabled on child application 112b on lead portal 110b for book lovers, whereas videos may be enabled on child application 112b on lead portal 110c for real estate buyers.

Figure 2:
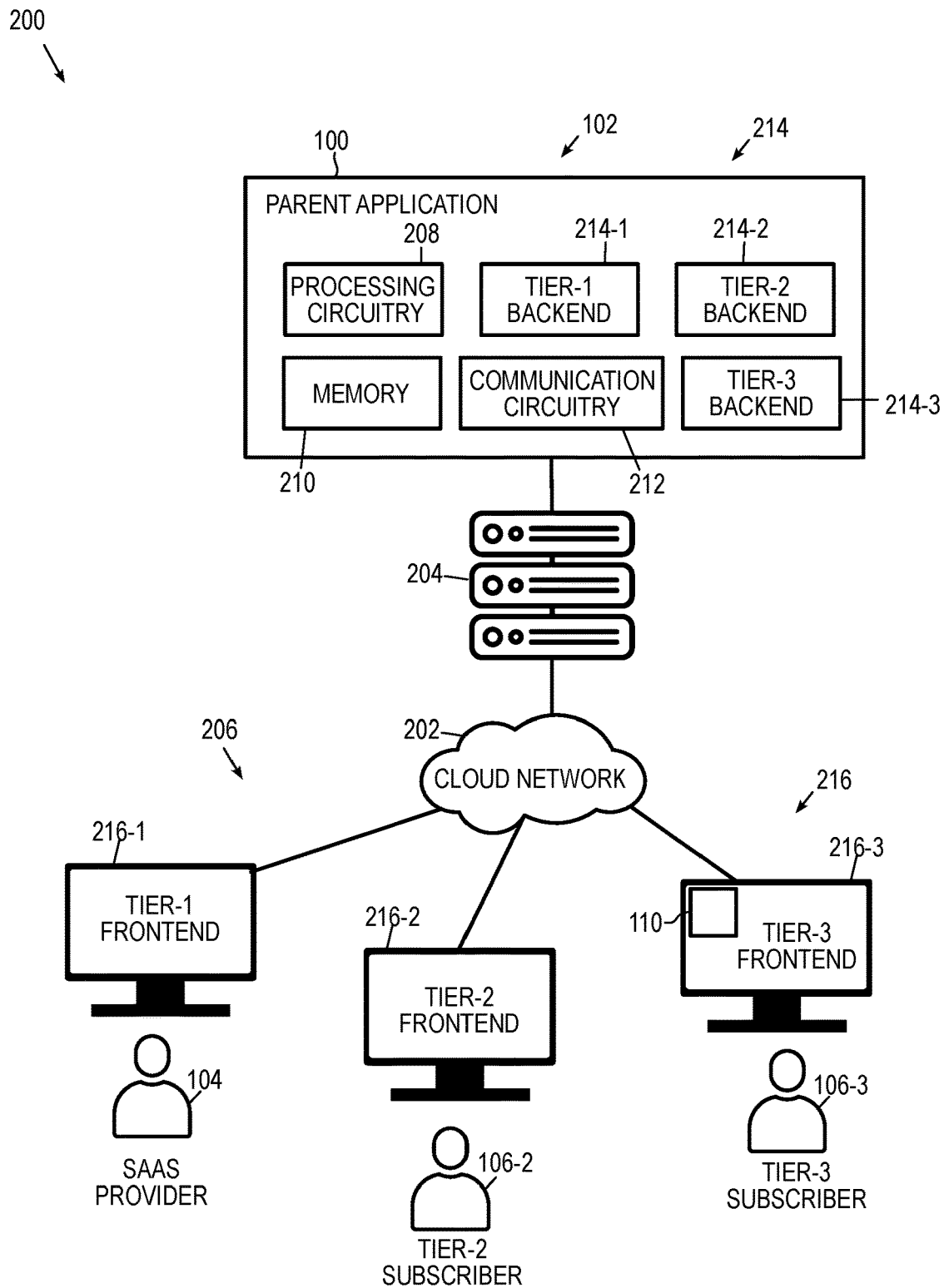
FIG. 2 is a simplified block diagram illustrating example details of the tiered software framework implementing the systems and methods for a lead portal with unified login for child applications, according to some embodiments of the present disclosure.

FIG. 2 is a simplified block diagram illustrating a tiered software framework 200 according to various embodiments. In example implementations, at least some portions of the activities outlined herein may be hosted on a cloud network 202 in one or more servers 204. At least some other portions of the activities outlined herein may be implemented in one or more computing devices 206 connected over one or more communication networks with cloud network 202. In particular embodiments, cloud network 202 is a collection of hardware devices and executable software forming a shared pool of configurable computing resources (e.g., networks, servers, storage, applications, services, etc.) that may be suitably provisioned to provide on-demand self-service, network access, resource pooling, elasticity and measured service, among other characteristics. Computing device 206 may have any desired form factor, such as a handheld or mobile computing device (e.g., a cell phone, a smart phone, a mobile Internet device, a tablet computer, a laptop computer, a netbook computer, an ultra-book computer, a Personal Digital Assistant (PDA), an ultramobile personal computer, etc.), a desktop computing device, a server or other networked computing component, a set-top box, an entertainment control unit, or a wearable computing device.

Certain portions of tiered software framework 200 (e.g., parent application 100) may execute using a processing circuitry 208, a memory 210 and communication circuitry 212 (among other components) in one or more servers 204. Certain other portions of tiered software framework 200 may execute in one or more computing devices 206 using respective processing circuitry, memory, and communication circuitry (not shown with particularity so as not to clutter the drawing) substantially similar in functionalities to processing circuitry 208, memory 210 and communication circuitry 212. In some embodiments, one or more of these functionalities may be implemented in hardware, provided external to these elements, or consolidated in any appropriate manner to achieve the intended functionality. The various network elements in tiered software framework 200 may include communication software that can coordinate to achieve the operations as outlined herein. In still other embodiments, these elements may include any suitable algorithms, hardware, software, components, modules, interfaces, or objects that facilitate the operations thereof.

Processing circuitry 208 may execute any type of instructions associated with data stored in memory 210 to achieve the operations detailed herein. In one example, processing circuitry 208 may transform data from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., field programmable gate array (FPGA), an erasable programmable read only memory (EPROM), an application specific integrated circuit (ASIC)) that includes digital logic, software, code, electronic instructions, flash memory, optical disks, magnetic or optical cards, other types of machine-readable mediums suitable for storing electronic instructions, or any suitable combination thereof.

In some of example embodiments, one or more memory 210 may store data used for the operations described herein. This includes memory 210 storing instructions (e.g., software, logic, code, etc.) in non-transitory media (e.g., random access memory (RAM), read only memory (ROM), FPGA, EPROM, etc.) such that the instructions are executed to carry out the activities described in this disclosure based on particular needs. In some embodiments, memory 210 may comprise non-transitory computer-readable media, including one or more memory devices such as volatile memory such as dynamic RAM (DRAM), nonvolatile memory (e.g., ROM), flash memory, solid-state memory, and/or a hard drive. In some embodiments, memory 210 may share a die with processing circuitry 208. Memory 210 may include algorithms, code, software modules, and applications, which may be executed by processing circuitry 208. The data being tracked, sent, received, or stored in tiered software framework 200 may be provided in any database, register, table, cache, queue, control list, or storage structure, based on particular needs and implementations, all of which could be referenced in any suitable timeframe.

Communication circuitry 212 may be configured for managing wired or wireless communications for the transfer of data in tiered software framework 200. The term "wireless" and its derivatives may be used to describe circuits, devices, systems, methods, techniques, communications channels, etc., that may communicate data through modulated electromagnetic radiation in a nonsolid medium. The term does not imply that the associated devices do not contain any wires, although in some embodiments they might not. Communication circuitry 212 may implement any of a number of wireless standards or protocols, including but not limited to Institute for Electrical and Electronic Engineers (IEEE) standards including Wi-Fi (IEEE 802.11 family), IEEE 802.16 standards (e.g., IEEE 802.16-2005 Amendment), Long Term Evolution (LTE) project along with any amendments, updates, and/or revisions (e.g., advanced LTE project, ultramobile broadband (UMB) project (also referred to as "3GPP2"), etc.). Communication circuitry 212 may operate in accordance with a Global System for Mobile Communication (GSM), General Packet Radio Service (GPRS), Universal Mobile Telecommunications System (UMTS), High-Speed Packet Access (HSPA), Evolved HSPA (E-HSPA), or LTE network. Communication circuitry 212 may operate in accordance with Enhanced Data for GSM Evolution (EDGE), GSM EDGE Radio Access Network (GERAN), Universal Terrestrial Radio Access Network (UTRAN), or Evolved UTRAN (E-UTRAN). Communication circuitry 212 may operate in accordance with Code Division Multiple Access (CDMA), Time Division Multiple Access (TDMA), Digital Enhanced Cordless Telecommunications (DECT), Evolution-Data Optimized (EV-DO), and derivatives thereof, as well as any other wireless protocols that are designated as 3G, 4G, 5G, and beyond. Communication circuitry 212 may operate in accordance with other wireless protocols in other embodiments. Communication circuitry 212 may include antennas to facilitate wireless communications and/or to receive other wireless communications.

In some embodiments, communication circuitry 212 may manage wired communications, such as electrical, optical, or any other suitable communication protocols (e.g., the Ethernet, Internet). Communication circuitry 212 may include multiple communication chips. For instance, a first communication chip may be dedicated to shorter-range wireless communications such as Wi-Fi or Bluetooth, and a second communication chip may be dedicated to longer-range wireless communications such as global positioning system (GPS), EDGE, GPRS, CDMA, WiMAX, LTE, EV-DO, or others. In some embodiments, a first communication chip may be dedicated to wireless communications, and a second communication chip may be dedicated to wired communications.

The example network environment may be configured over a physical infrastructure that may include one or more networks and, further, may be configured in any form including, but not limited to, local area networks (LANs), wireless local area networks (WLANs), virtual local area networks (VLANs), metropolitan area networks (MANs), wide area networks (WANs), virtual private networks (VPNs), Intranet, Extranet, any other appropriate architecture or system, or any combination thereof that facilitates communications in a network. In some embodiments, a communication link may represent any electronic link supporting a LAN environment such as, for example, cable, Ethernet, wireless technologies (e.g., IEEE 802.11x), ATM, fiber optics, etc. or any suitable combination thereof. In other embodiments, communication links may represent a remote connection through any appropriate medium (e.g., digital subscriber lines (DSL), telephone lines, T1 lines, T3 lines, wireless, satellite, fiber optics, cable, Ethernet, etc. or any combination thereof) and/or through any additional networks such as a WANs (e.g., the Internet).

Parent application 100 may be implemented in tiered software framework 200 comprising at least three tiers 102: tier-1 (102-1), tier-2 (102-2), and tier-3 (102-3). Tiers 102 may be organized according to a hierarchy of management (i.e., to oversee, to control, to maintain), with upstream tiers managing downstream ones. Thus, tier 102-1 comprises operations that may manage tiers 102-2 and 102-3, whereas tier 102-2 comprises operations that may manage tier 102-3 but not tier 102-1. For purposes of terminology, tier 102-1 is "upstream" relative to tiers 102-2 and 102-3; tier 102-3 is "downstream" relative to tiers 102-2 and 102-1; tier 102-2 is downstream relative to tier 102-1 and upstream relative to tier 102-3. In some embodiments, each tier 102 may interact with the tier immediately adjacent thereto (e.g., downstream or upstream) but not with non-adjacent tiers. In some other embodiments, any tier 102 may interact with any other tier. In an example embodiment, tier 102-3 comprises marketing activities by business locations such as a dentist's office, a plumber's business, etc.; tier 102-2 comprises software operations by one or marketing agencies whose customers are the business locations of tier 102-3; and tier 101-1 comprises software operations by SaaS provider 104 whose customers are the marketing agencies of tier 102-2.

In various embodiments, tiers 102 may be partitioned into a backend 214 and a frontend 216. Backend 214 may comprise tier-1 backend 214-1, tier-2 backend 214-2, and tier-3 backend 214-3 provisioned in one or more servers 204. Likewise, frontend 216 may comprise tier-1 frontend 216-1, tier-2 frontend 216-2, and tier-3 frontend 216-3 provisioned in one or more computing devices 206. Backend 214 may comprise various modules, logic, software engines and other components that are distributed (and common) across all users of tiered software framework 200. Backend 214 may execute operations for managing and processing data, performing computations, and facilitating communication between different components, such as components of parent application 100. In particular embodiments, backend 214 may include operations such as data management, business logic, user authentication and authorization, security and validation, application programming interfaces (APIs) with third-party components such as payment processors, etc. In various embodiments, various components of parent application 100, may operate in backend 214 with data spread across all tiers 102-1, 102-2 and 102-3.

In a general sense, frontend 216 comprises at least surface 116 using which users interact with tiered software framework 200. Frontend 216 may also include libraries, forms, device integrators and other components as desired and based on particular needs. Frontend 216 may be presented on a suitable display device coupled to computing device 206 and appropriate to show visual indicators, such as a heads-up display, a computer monitor, a projector, a touch-screen display, a liquid crystal display (LCD), a light-emitting diode display, and/or a flat panel display. In various embodiments, frontend 216 may be specific to the particular one of tier 102. For example, frontend 216-1 at tier-1 may comprise certain functionalities available (and visible) only to SaaS provider 104. Frontend 216-2 at tier-2 may comprise certain functionalities available (and visible) only to tier-2 subscriber 106-2. Frontend 216-3 at tier-3 may comprise certain functionalities available (and visible) only to tier-3 subscriber 106-3.

In various embodiments, lead portal 110 may be displayed and/or otherwise accessed at frontend 216-3. Frontend 216-3 may include the presentation layer of parent application 100 using data and resources specific to tier-3 102-3. Such presentation layer may include UI components (e.g., forms, buttons, menus, etc.), graphical elements (e.g., images, icons, videos, etc.), presentation logic (e.g., formatting, sorting, filtering of data relevant to the UI), data visualization components (e.g., charts, graphs, etc.), scripts (e.g., JavaScript™ for interactive rendering), and such other components that facilitate presentation of lead portal 110 on a suitable screen (e.g., computer monitor, phone display, etc.).

Tiered software framework 200 described and shown herein (and/or its associated structures) may also include suitable interfaces for receiving, transmitting, and/or otherwise communicating data or information in a network environment. In a general sense, the arrangements depicted in the figures may be more logical in their representations, whereas a physical architecture may include various permutations, combinations, and/or hybrids of these elements. It is imperative to note that countless possible design configurations can be used to achieve the operational objectives outlined here. Accordingly, the associated infrastructure has a myriad of substitute arrangements, design choices, device possibilities, hardware configurations, software implementations, equipment options, etc.

Figure 3:
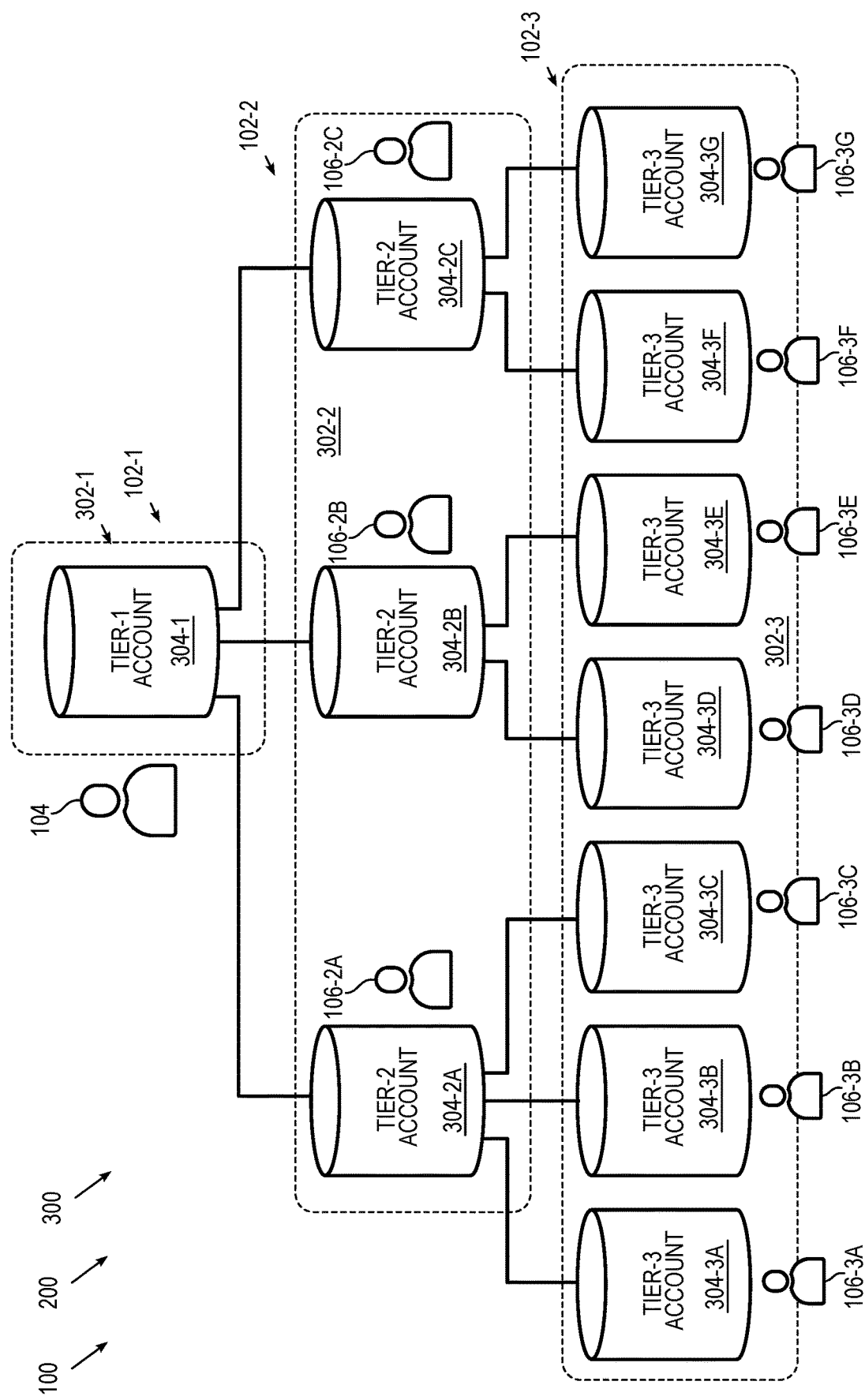
FIG. 3 is a simplified block diagram illustrating other example details of the tiered software framework implementing the systems and methods for a lead portal with unified login for child applications, according to some embodiments of the present disclosure.

FIG. 3 is a simplified block diagram illustrating example details of data hierarchy 300 of tiered software framework 200 implementing parent application 100, according to some embodiments of the present disclosure. In various embodiments, data 302 communicated in tiered software framework 200 may be exclusively received from users such as SaaS provider 104 and subscribers 106-2, and 106-3; in some other embodiments, data 302 may also be received from other sources, such as third parties and/or from the Internet. Examples of data 302 include business niche targeted by subscribers 106, marketing activities such as on social media, target audience of subscribers 106, login credentials to access various marketing platforms, frequency of marketing activities, information to be included in the content of marketing posts, customer lists, business locations, marketing platform rules, and other such data relevant to the functionalities offered by tiered software framework 200. Data 302 may be stored in data lakes, databases, data warehouses, blockchains, file systems and other types of data storage facilities within the broad scope of the embodiments with corresponding accessing and viewing capabilities as described herein.

Data 302 in each tier 102 may be contained within accounts 304 accessible and viewable with appropriate access credentials. For example, account 304-1 may be associated with SaaS provider 104. Account 304-1 may manage a plurality of accounts 304-2 at tier 102-2. Subscriber 106-2a may have a subscription to account 304-2a in plurality of accounts 304-2. Account 304-2a may manage a plurality of accounts 304-3 at tier 102-3. Subscriber 106-3a may have a subscription to account 304-3a in plurality of accounts 304-3; subscriber 106-3b may have a subscription to account 304-3b in plurality of accounts 304-3; and subscriber 106-3c may have a subscription to account 304-3c in plurality of accounts 304-3. In other words, subscriber 106-2a has three downstream subscribers at tier 102-3, namely subscribers 106-3a, 106-3b, and 106-3c with their associated respective accounts 304-3a, 304-3b, and 304-3c. Likewise for other accounts shown in the figure. Note that such a framework is merely provided for illustrative purposes and should not be construed as a limitation. Any number of subscribers may be provided at tiers 102-2 and 102-3 in tiered software framework 200 within the broad scope of the embodiments. Note also that the labeling convention followed herein uses letters to denote a separate instance of the same or similar component (e.g., "a" denotes instance A, "b" denotes instance B, and so on).

Downstream accounts may also be called "subaccounts" relative to the immediately upstream accounts in this disclosure. For example, accounts 304-3 are subaccounts relative to accounts 304-2. In the specific example shown, accounts 304-3a . . . 304-3c are subaccounts of account 304-2a; accounts 304-3d and 304-3e are subaccounts of account 304-2b; accounts 304-3f and 304-3g are subaccounts of account 304-2c. Likewise, accounts 304-2a . . . 304-2c are subaccounts of account 304-1.

In various embodiments, data 302 may be arranged in data hierarchy 300 for different accounts 304 such that certain users can view and access only a subset of data 302 according to their respective tier 102 and access credentials based on particular needs (e.g., user credentials may indicate which tier 102 and which corresponding accounts 304 are available for access and view). Such accounts 304 may be facilitated by a suitable user interface at frontend 216 for viewing the accessible data. Appropriate user authentication and authorization engines running in backend 214 may ensure that accounts 304 are maintained as desired and appropriate privacy blocks are applied at appropriate tiers 102.

In the example illustrated herein, tier-1 data 302-1 may be of account 304-1; tier-2 data 302-2 may be of accounts 304-2a, 304-2b and 304-2c corresponding to subscribers 106-2a, 106-2b and 106-2c, respectively; tier-3 data 302-3 may be of accounts 304-3a . . . 304-3g corresponding to subscribers 106-3a . . . 106-3g. Subscribers 106-3a . . . 106-3g may access and view their own respective accounts 304-3a . . . 304-3g; however, they cannot access or view other accounts 304 in the same tier 102-3 or in upstream tiers 102-2 or 102-1. Note that accessing and viewing an account refers to accessing and viewing the data of the account. Subscribers 106-2a . . . 106-2c at tier 102-3 may access and view their own respective accounts 304-2a . . . 304-2c as well as downstream accounts 304-3 of their respective subscribers 106-3; however, they cannot access or view other accounts 304-2 in the same tier 102-2, or in downstream tier 102-3 not associated with their downstream subscribers 106-3, or in upstream tier 102-1. For example, subscriber 106-2a may access and view accounts 304-2a, 304-3a, 304-3b, and 304-3c; subscriber 106-2b may access and view accounts 304-2b, 304-3d, and 304-3e; subscriber 106-2c may access and view accounts 304-2c, 304-3f, and 304-3g. SaaS provider 104 at tier 102-1 may access and view accounts 304-1 at tier 102-1, 304-2a . . . 304-2c at tier 102-2, and 304-3a . . . 304-3g at tier 102-3.

Figure 4:
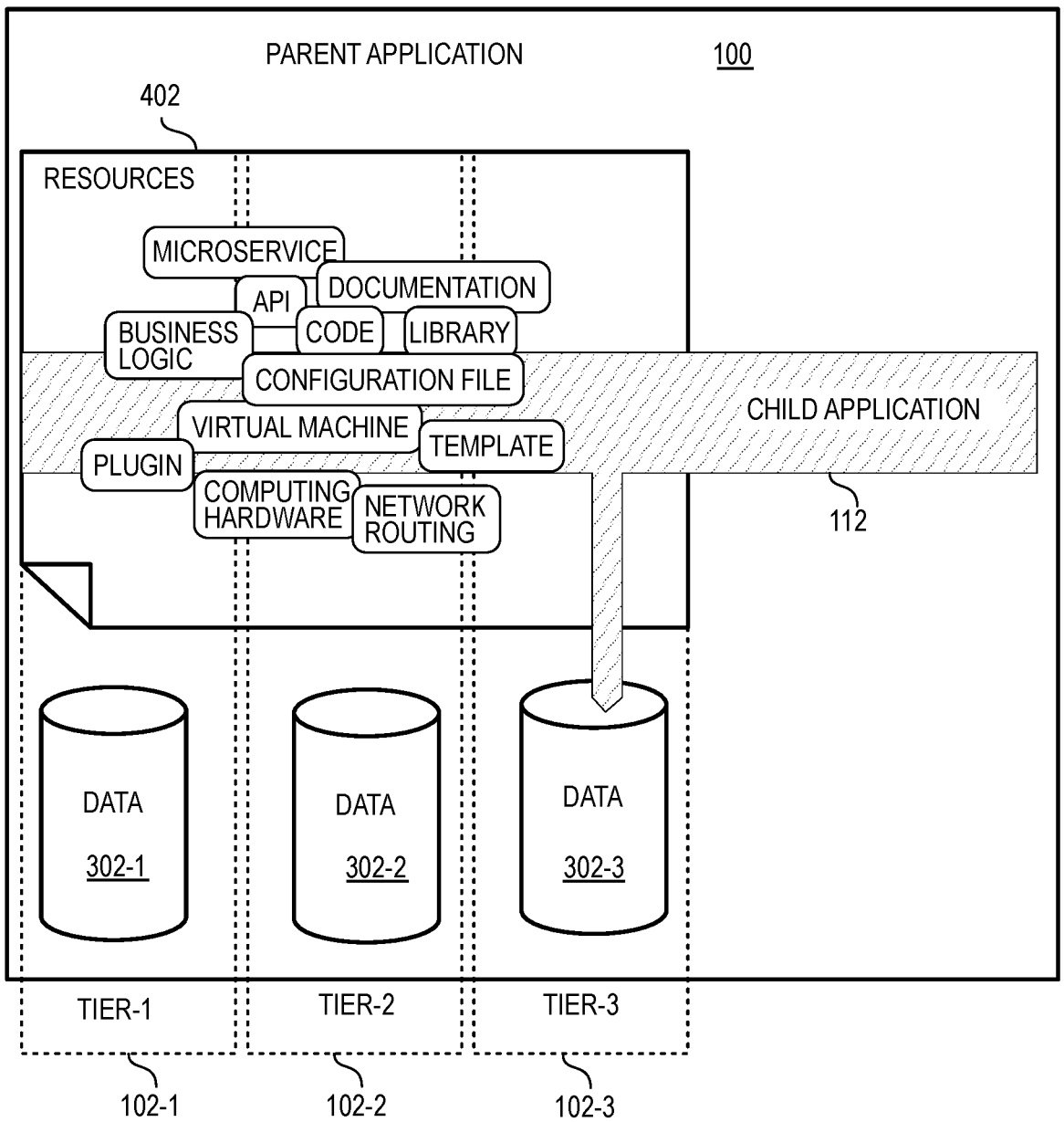
FIG. 4 is a simplified block diagram illustrating example details of a system for a lead portal with unified login for child applications in a tiered software framework, according to some embodiments of the present disclosure.

FIG. 4 is a simplified block diagram illustrating example details of parent application 100, according to some embodiments of the present disclosure. Parent application 100 may comprise resource 402 provisioned across tiers 102-1, 102-2 and 102-3 and data 302 partitioned into tiers 102 as 302-1, 302-2, and 302-3. Such shared resources may include, as examples and not as limitations, relevant business logic, network routing, microservices, computing hardware, virtual machines, APIs, libraries, templates, documentation, code, plugins or extensions, program files, and configuration files. In various embodiments, some resources 402 may be provisioned in backend 214 and other resources may be provisioned in frontend 216.

In various embodiments, child application 112 may use resources 402 common across tiers 102-1, 102-2 and 102-3. In particular, child application 112 may provide functionalities that are provided by, or provisioned in, or enabled by parent application 100. In such embodiments, child application 112 may not be for a purpose unrelated to parent application 100. In a particular example embodiment, parent application 100 may provide marketing related functionalities; in such example embodiment, child applications 112 may be related to lead management.

As described with reference to the previous figures, parent application 100 may have hierarchical data access, with access to tier 102-1 providing access to some data 302-1, 302-2 and 302-3 across tiers 102-1, 102-2, and 102-3; access to tier 102-2 providing access to some data 302-2 and 302-3 across tiers 102-2, and 102-3; and access to tier 102-3 providing access to some data 302-3 in tier 102-3. Data of leads 108 as also tier-3 subscribers 106-3 associated therewith may be comprised in tier-3 data 302-3. Data accessed by child applications 112 may be limited to such tier-3 data 302-3. Data 302-3 accessed by child applications 112 may include login credentials, lead portal settings, activity history, preferences, etc.

Figure 5:
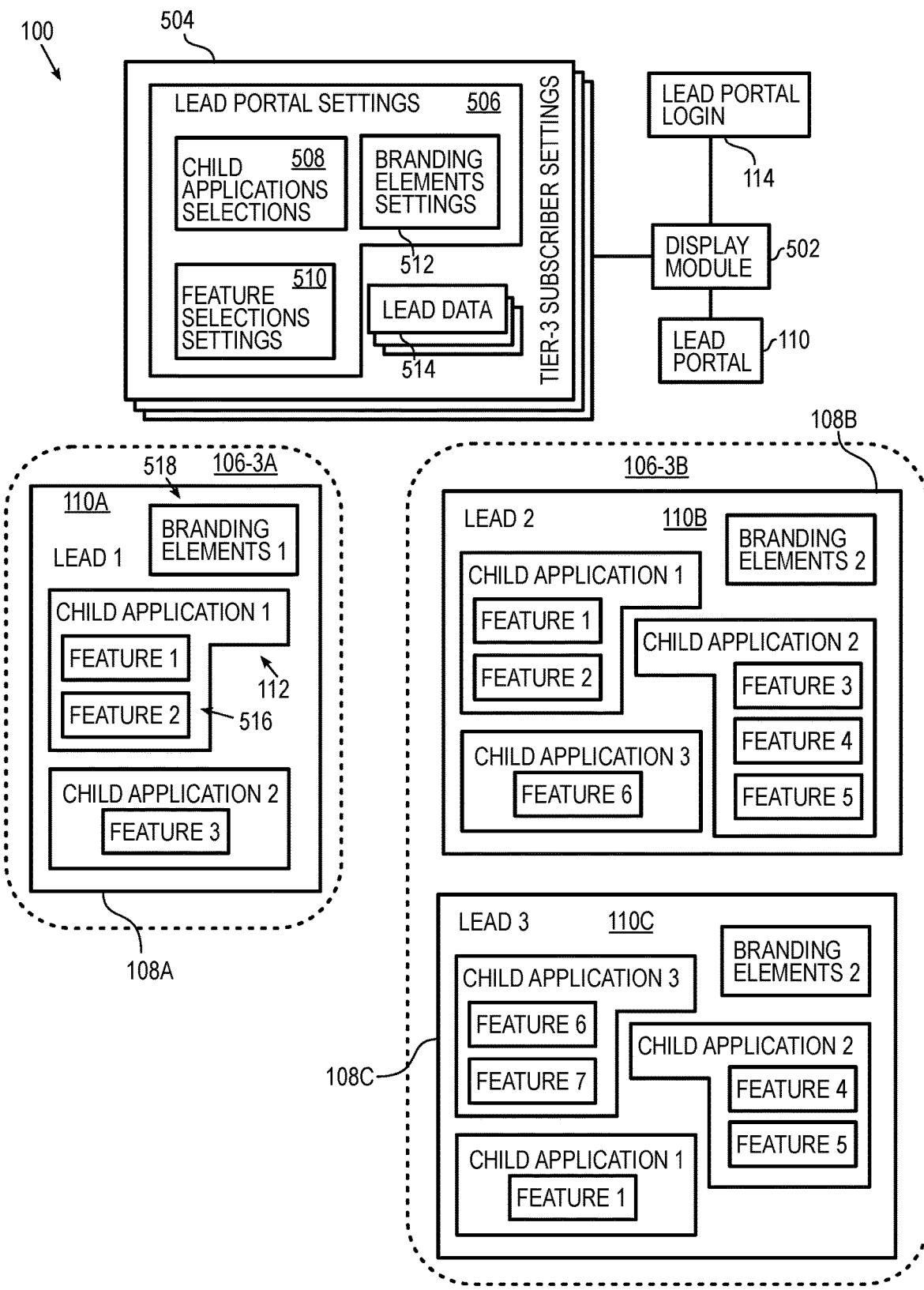
FIG. 5 is a simplified block diagram illustrating other example details of a system for a lead portal with unified login for child applications in a tiered software framework, according to some embodiments of the present disclosure.

FIG. 5 is a simplified block diagram illustrating example details of parent application 100, according to some embodiments of the present disclosure. Lead portal login 114 may receive login credentials of a user of lead portal 110. Lead portal login 114 may identify the login credentials as corresponding to lead 108 of tier-3 subscriber 106-3. A display module 502 may retrieve tier-3 subscriber settings 504 associated with subscriber 106-3 based on the login credentials entered. Tier-3 subscriber settings 504 may include lead portal settings 506, comprising child applications selections 508, feature selections settings 510, and branding elements settings 512. Additionally, lead data 514 associated with one or more leads 108 who may access lead portal 110 associated with tier-3 subscriber 106-3a are also included in tier-3 subscriber settings 504. Display module 502 may use tier-3 subscriber settings 504 to generate lead portal 110. In various embodiments, child applications selections 508 comprise selections of child applications 112 selected by tier-3 subscriber 106-3 for display on lead portal 110. Feature selections settings 510 comprise selections of UI features 516 for the selected child applications 112.

For example, assume that the login credentials correspond to lead 108a of subscriber 106-3a. Child applications 112 selected for lead portal 110 may include child application 1 and child application 2. Additionally, UI features 516 for child application 1 include feature 1 and feature 2, and for child application 2 includes feature 3. In some embodiments, substantially all leads 108 of subscriber 106-3a may see child application 1 with feature 1 and feature 2, and child application 2 with feature 3 when they log into lead portal 110. In some other embodiments, UI features 516 may vary according to lead data 514 for each lead. In addition, branding elements 518 set for lead portal 110 may comprise branding elements 1, which may include, by way of example only, logo and trade name of tier-3 subscriber 106-3.

Assume, merely for the sake of explanation and not as a limitation, that another login credential is identified by lead portal login 114 as corresponding to lead 108b of subscriber 106-3b. Tier-3 subscriber settings 504 for subscriber 106-3b include child applications 112 including child application 1, child application 2 and child application 3. Additionally, UI features 516 for child application 1 include feature 1 and feature 2, for child application 2 includes feature 3, feature 4 and feature 5, and for child application 3 includes feature 6. Branding elements 518 include branding elements 2, which may differ from branding elements 1. These tier-3 subscriber settings 504 may be retrieved by display module 502 and displayed on lead portal 110b.

In some other embodiments, UI features 516 may vary according to lead data 514 for each lead. Thus, another lead 108c of subscriber 106-3b may see on lead portal 110c, the same child applications 112, namely child application 1, child application 2, and child application 3. However, UI features 516 for child application 1 may include only feature 1, for child application 2 may include only feature 4 and feature 5, and for child application 3 may include feature 6 and feature 7. Such feature selections may be based on lead data 514, including billing levels, user settings, and other such configurations based on particular needs.

Figure 6A:
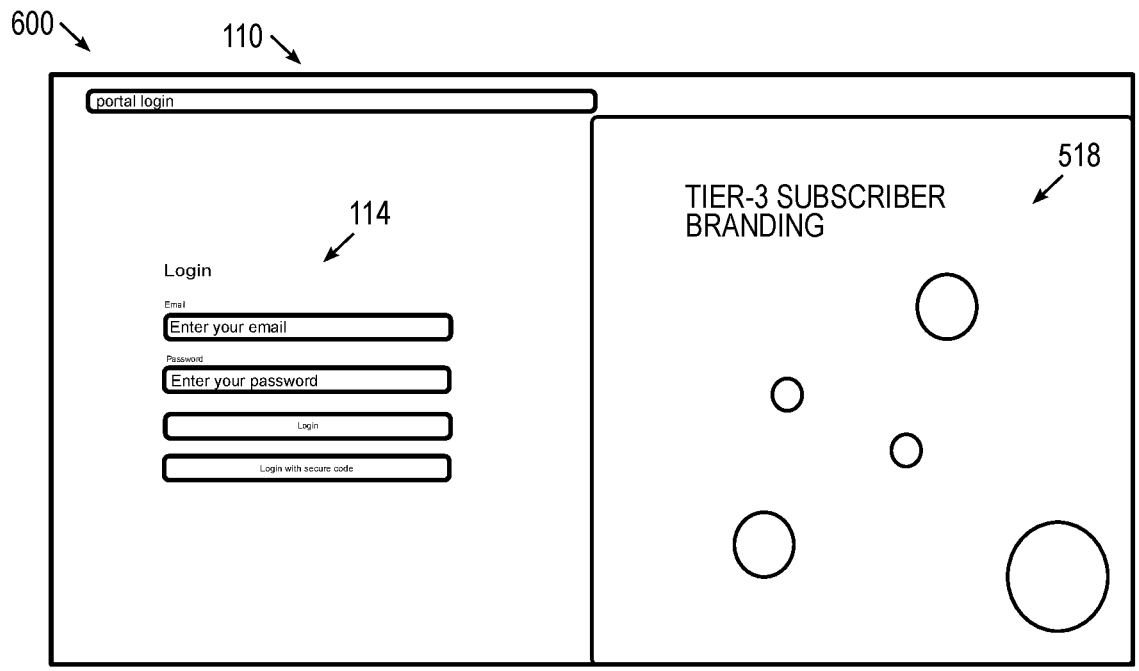
FIGS. 6A and 6B are simplified block diagrams illustrating example user interfaces of the system for a lead portal with unified login for child applications in a tiered software framework, according to some embodiments of the present disclosure.
Figure 6B:
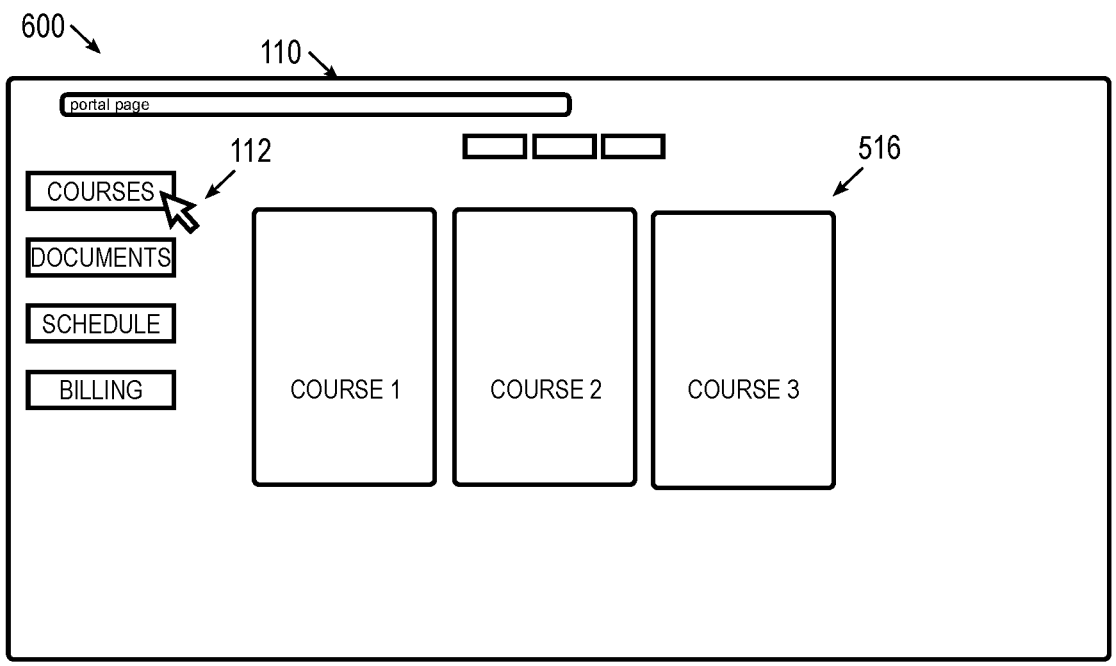

FIGS. 6A-6B are simplified diagrams illustrating example details of a user interface 600 of lead portal 110 according to various embodiments. User interface 600 may be visible to leads 108. Portions of user interface 600 may include tier-3 subscriber branding comprising branding elements 518 and means for logging in, for example, powered by lead portal login 114. Lead portal login 114 may provide a centralized login interface for multiple child applications 112 as shown in FIG. 5B. Clicking on or otherwise selecting a particular one of child applications 112 may present a customized user interface applicable to the selected child application with UI features 516 suitable for the login credentials. For example, a particular lead 108A may have opted to register for courses 1 and 2 but not course 3, whereas another lead 108B may have opted to register for three courses 1, 2 and 3 in child application 112 comprising "Courses." When lead 108a logs into lead portal 110, only courses 1 and 2 may be visible or selectable, whereas course 3 may be invisible, greyed out or otherwise unusable. On the other hand, when lead 108b logs into lead portal 110, courses 1, 2 and 3 may be visible or selectable.

Figure 7A:
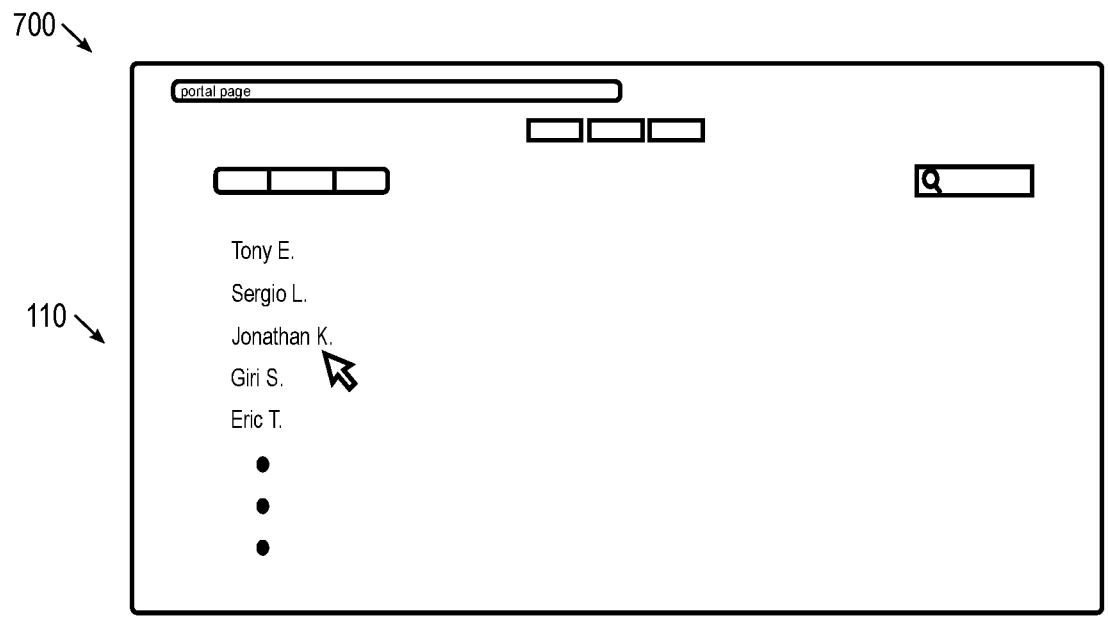
FIGS. 7A and 7B are simplified block diagrams illustrating example user interfaces of the system for a lead portal with unified login for child applications in a tiered software framework, according to some embodiments of the present disclosure.
Figure 7B:
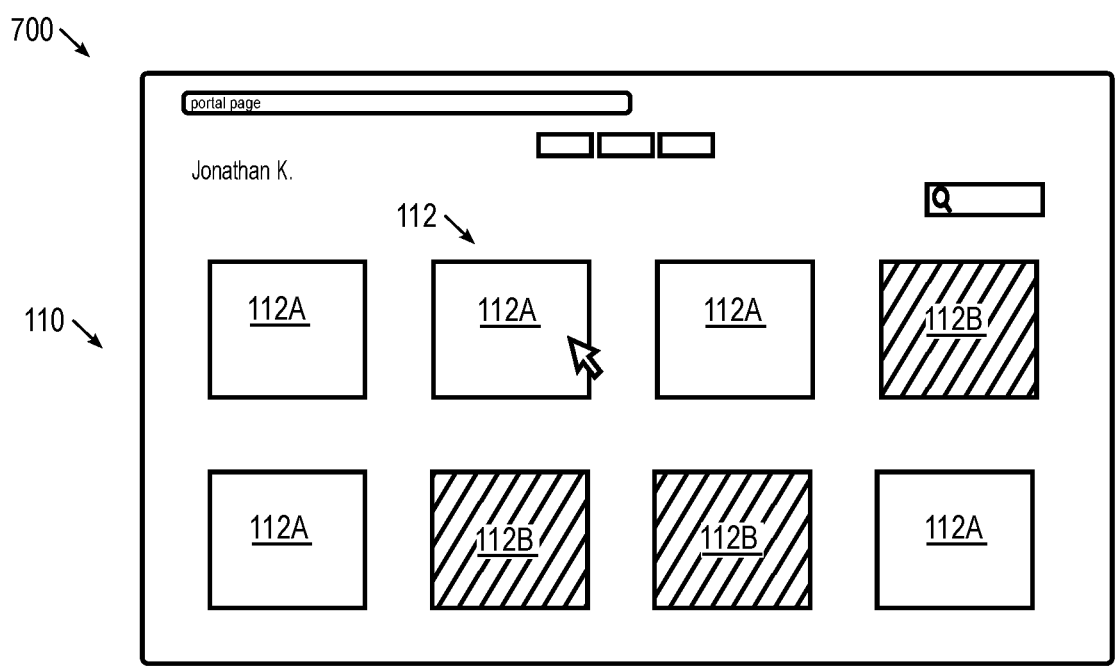

FIGS. 7A-7B are simplified diagrams illustrating example details of a user interface 700 of lead portal 110 according to various embodiments. User interface 600 may be visible to relevant tier-3 subscriber 106-3. User interface 600 may allow tier-3 subscriber to configure lead portal 110 suitably. For example, a particular one of user interface 600 may show a list of leads 108 that have signed up to access lead portal 108. Selecting one of leads 108, say "Jonathan K." may bring up another one of user interface 700 showing child applications 112 as shown in FIG. 6B. Jonathan K. may have access to a subset of child applications 112, namely 112a, whereas other ones of child applications 112, namely 112b may be inaccessible to Jonathan K. In some embodiments, tier-3 subscriber 106-3 may manually select and/or unselect child applications 112a and 112b. In some other embodiments, tier-3 subscriber 106-3 may specify separately child applications 112a (or 112b) to which Jonathan K. has access (or not) and parent application 100 may automatically select such child applications 112a to present on user interface 600 appropriately. In various embodiments, parent application 100 enables a mix-and-match approach for tier-3 subscriber 106-3 to select (or unselect) various child applications 112 based on particular needs or as desired.

Figure 8:
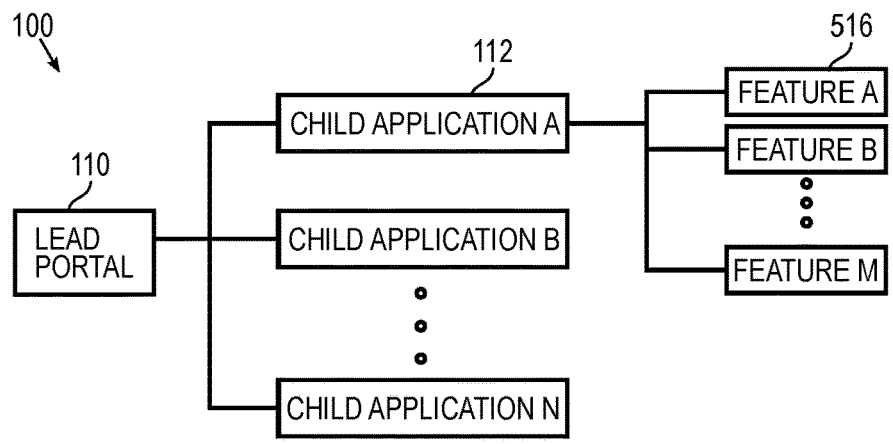
FIG. 8 is a simplified block diagram illustrating example details of a system for a lead portal with unified login for child applications in a tiered software framework, according to some embodiments of the present disclosure.

FIG. 8 is a simplified block diagram illustrating example details of parent application 100 according to various embodiments. Each lead portal 110 for a particular one of tier-3 subscriber 106 may include a plurality of child applications 112, each one of which may have another plurality of UI features 516. Each lead portal 110 may include a subset of child applications 112 available for selection in parent application 100. In some embodiments, one or more of lead portal 110 may include substantially all child applications 112 available for selection in parent application 100. In some other embodiments, one or more of lead portal 110 may include a selection from available child applications 112 based on subscriber settings, lead data, billing constraints, business needs of tier-3 subscriber 106-3 and other considerations. Likewise, each child application 112 may include one or more UI features 516 that may be selected and made available on user interface 600 based on various settings by tier-3 subscriber 106-3 and data associated with login credentials of lead 108.

Figure 9:
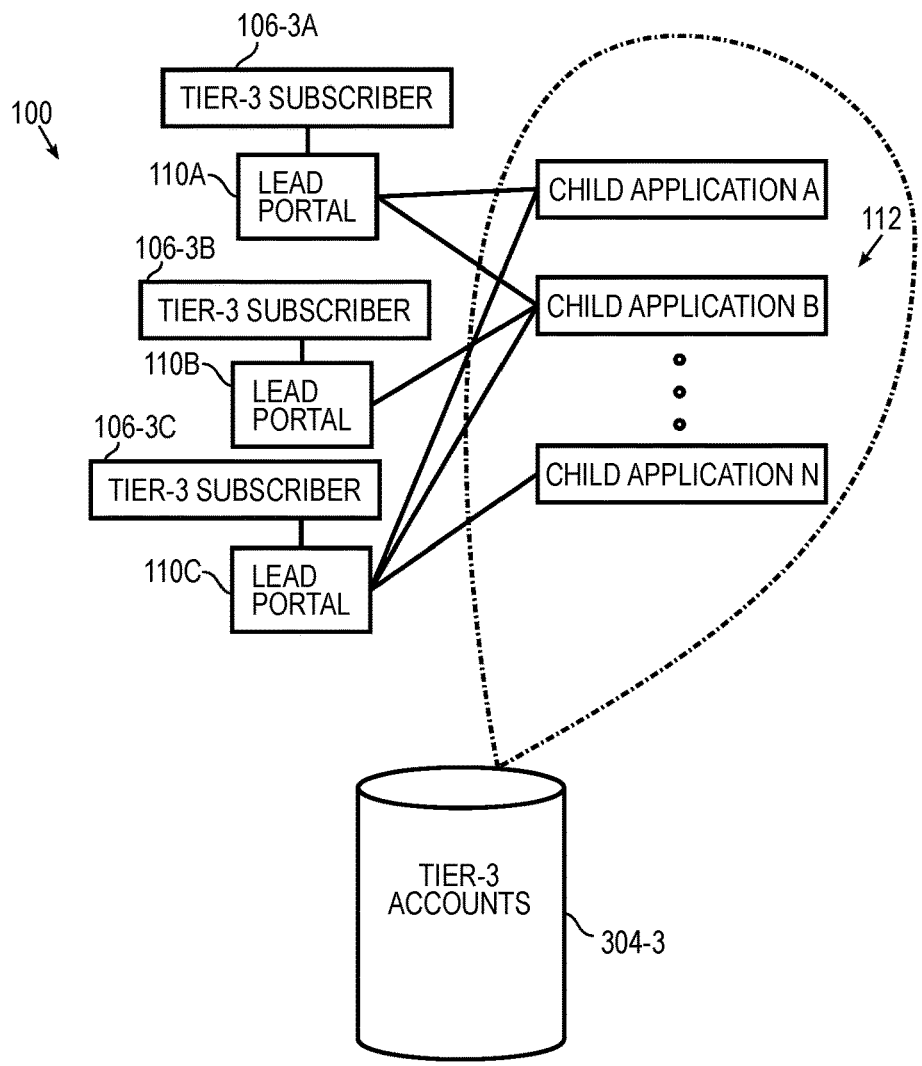
FIG. 9 is a simplified block diagram illustrating yet other example details of a system for a lead portal with unified login for child applications in a tiered software framework, according to some embodiments of the present disclosure.

FIG. 9 is a simplified block diagram illustrating example details of parent application 100 according to various embodiments. Each tier-3 subscriber 106-3 may control one or more lead portals 110. For example, tier-3 subscriber 106-3a may control lead portal 110a; tier-3 subscriber 106-3b may control lead portal 110b; tier-3 subscriber 106-3c may control lead portal 110c; and so on. Each lead portal 110 may allow access to one or more child applications 112. For example, lead portal 110a may allow access to child application A and child application B; lead portal 110b may allow access to child application B; lead portal 110c may allow access to child application A, child application B and child application N and so on. Configurations for access to suitable child applications 112 may be saved in relevant tier-3 subscriber accounts 304-3.

Although the present disclosure has been described in detail with reference to particular arrangements and configurations, these example configurations and arrangements may be changed significantly without departing from the scope of the present disclosure. For example, although the present disclosure has been described with reference to particular network systems such as cloud networks, parent application 100 may be implemented in other networks such as LANs. Moreover, although tiered software framework 200 has been illustrated with reference to particular elements and operations that facilitate the software process, these elements, and operations may be replaced by any suitable architecture or process that achieves the intended functionality of parent application 100.

Example Methods

FIG. 9 is a simplified flow diagram illustrating example operations 900 that may be associated with parent application 100 according to various embodiments. At 902, lead 108 may log into lead portal 110. At 904, lead 108 may access multiple child applications 112 on lead portal 110. At 906, lead 108 may access multiple UI features 416 of child applications 112.

Figure 10:
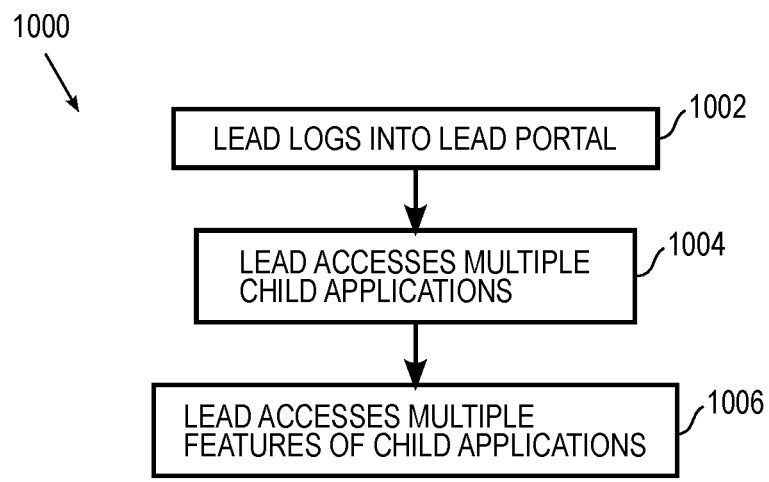
FIG. 10 is a simplified flow diagram illustrating example operations associated with methods for a lead portal with unified login for child applications in a tiered software framework, according to some embodiments of the present disclosure.

FIG. 10 is a simplified flow diagram illustrating example operations 1000 that may be associated with parent application 100 according to various embodiments. At 1002, tier-3 subscriber 106-3 may select available child applications 112. At 1004, tier-3 subscriber 106-3 may select available UI features 516 of each child application 112. At 1006, tier-3 subscriber 106-3 may configure lead portal 110 with available child applications 112.

Figure 12:
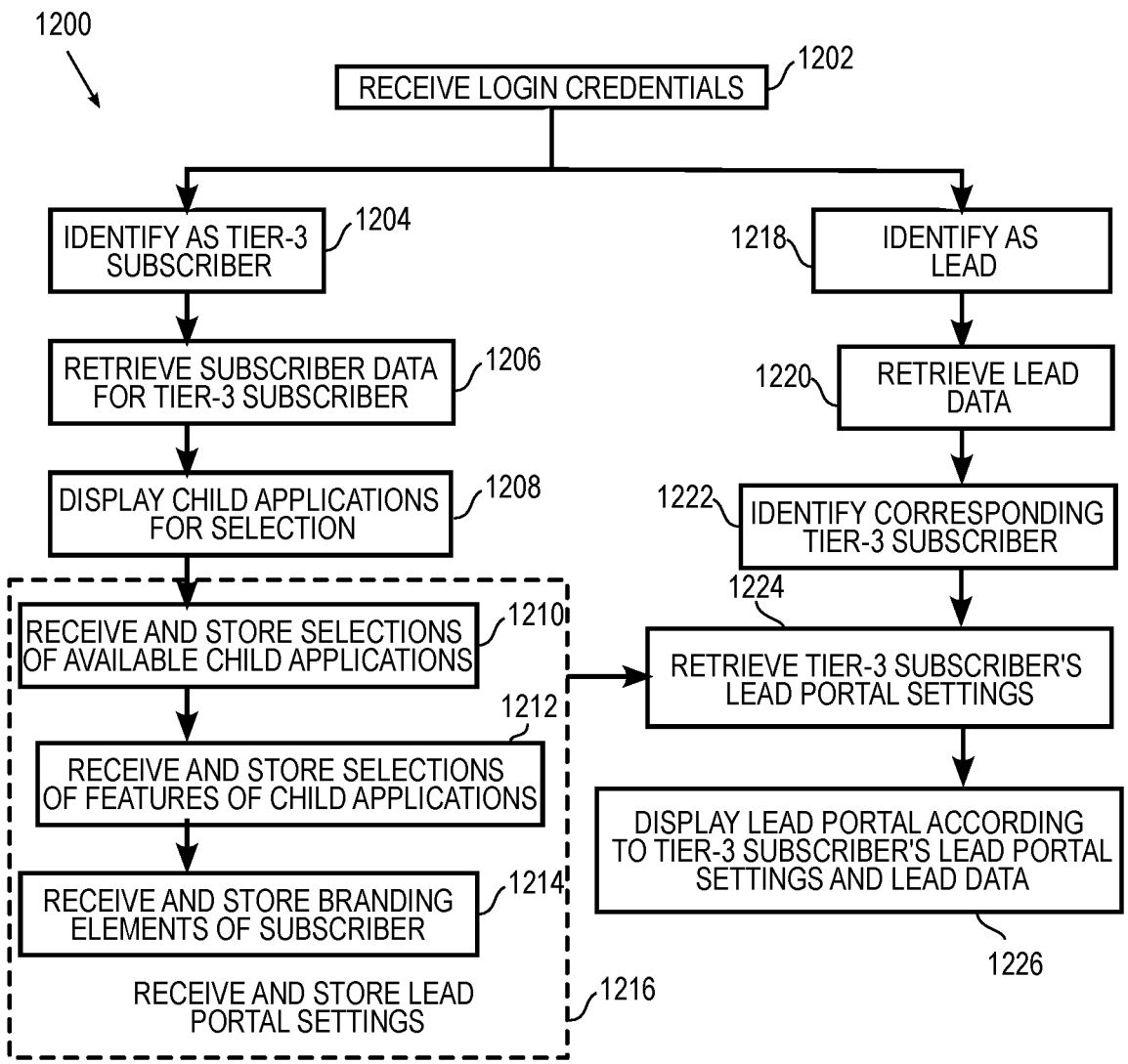
FIG. 12 is a simplified flow diagram illustrating yet other example operations associated with methods for a lead portal with unified login for child applications in a tiered software framework, according to some embodiments of the present disclosure.

FIG. 12 is a simplified flow diagram illustrating example operations 1200 that may be associated with parent application 100 according to various embodiments. At 1202, parent application 100 may receive login credentials over lead portal login 114. At 1204, lead portal login 114 may identify the login credentials as associated with tier-3 subscriber 106-3. At 1206, subscriber data for tier-3 subscriber 106-3 may be retrieved from applicable tier-3 subscriber account 304-3. At 1208, child applications 112 may be identified for the identified subscriber data and the identified child applications 112 may be made available for selection on lead portal 110. At 1210, selections of child applications 112 may be received and stored appropriately as child application selections 508. At 1212, selections of available UI features 516 for each child application 112 may be received and stored appropriately as feature selection settings 410. At 1216, branding elements settings 512 for lead portal 110 may be received and stored. Such settings including from operations 1210-1214 may be stored as lead portal settings 504 at 1216.

At 1218, lead portal login 114 may identify the login credentials at operation 1102 as associated with lead 108. At 1220, suitable lead data may be retrieved. Such lead data may include usage history, preferences, etc. from prior use of lead portal 110 in some embodiments. At 1222, corresponding tier-3 subscriber 106-3 associated with lead 108 may be identified. At 1224, tier-3 subscriber's lead portal settings 504 stored at 1216 may be retrieved. At 1226, lead portal 110 may be displayed according to tier-3 subscriber's settings and lead data.

In various embodiments, at least some of the operations described in FIGS. 9-11 may be performed automatically without human intervention. Although FIGS. 9-11 illustrate various operations performed in a particular order, this is simply illustrative, and the operations discussed herein may be reordered and/or repeated as suitable. Further, additional operations which are not illustrated may also be performed without departing from the scope of the present disclosure. Also, various ones of the operations discussed herein with respect to FIGS. 9-11 may be modified in accordance with the present disclosure to facilitate lead portals in tiered software framework 200 as disclosed herein. Although various operations are illustrated in FIGS. 9-11 once each, the operations may be repeated as often as desired.

It is important to note that the operations described with reference to the preceding figures illustrate only some of the possible scenarios that may be executed by, or within, parent application 100. Some of these operations may be deleted or removed where appropriate, or these steps may be modified or changed considerably without departing from the scope of the discussed concepts. In addition, the timing of these operations may be altered considerably and still achieve the results taught in this disclosure. The preceding operational flows have been offered for purposes of example and discussion.

Select Examples

Example 1 provides a method for facilitating a lead portal with unified login for child applications in a tiered software framework, the method including receiving a login credential at a lead portal displayed in a frontend of a parent application; and displaying a subset of child applications selected from a plurality of child applications on the lead portal, the subset being selected based on the login credential; in which: the parent application includes the tiered software framework having a first tier, a second tier and a third tier arranged according to hierarchical data access, with the first tier having the greatest access and the third tier having the least access to data of the parent application, the child applications are for mutually different purposes, the child applications are to use resources except data common across the first tier, the second tier and the third tier at a backend of the parent application, the child applications are to use data specific to the third tier, the backend is to execute remotely from the frontend over a cloud network, the login credential is of a lead associated with the third tier, and different login credentials are associated with correspondingly different subsets of the child applications.

Example 2 provides the method of example 1, in which the resources include at least one of: microservices, documentation, program files, business logic, application programming interfaces (APIs), code, libraries, templates, virtual machines, computing hardware, plugins, network routing resources, and configuration files.

Example 3 provides the method of example 1 or 2, in which: the second tier and the third tier have corresponding subscribers, and the login credential belongs to a lead of a subscriber to the third tier.

Example 4 provides the method of example 3, in which: different subscribers to the third tier are associated with correspondingly different subsets of the child applications, and different leads of a common subscriber are associated with the same subset of the child applications.

Example 5 provides the method of any one of examples 1-4, in which each child application includes one or more user interface (UI) features providing a corresponding functionality.

Example 6 provides the method of example 5, in which the UI features are displayed according to respective settings associated with login credentials of individual users of the lead portal. Example 7 provides the method of example 5, in which the UI features are displayed according to respective settings associated with login credentials of subscribers to the third tier.

Example 8 provides the method of any one of examples 1-7, in which each of first tier, the second tier and the third tier is associated with a separate surface providing different functionalities.

Example 9 provides the method of any one of examples 1-8, in which the child applications relate to lead management.

Example 10 provides the method of example 9, in which the child applications include: communities, e-commerce, course, affiliate manager, appointments, subscriptions, credit card management, document management, and accounting and billing.

Example 11 provides the method of any one of examples 1-10, in which: access to the first tier enables access to at least portions of the first tier, the second tier and the third tier, access to the second tier enables access to at least portions of the second tier and the third tier, but not to the first tier, and access to the third tier enables access to portions of the third tier, but not to the first tier or to the second tier.

Example 12 provides the method of any one of examples 1-11, further including receiving another login credential at the lead portal; identifying the another login credential as belonging to a subscriber to the third tier; retrieving subscriber data of the subscriber; displaying the plurality of child applications on the lead portal for selection by the subscriber; receiving and storing selections of the child applications; receiving and storing selections of features for each selected child application; and receiving and storing branding elements for the lead portal associated with the subscriber, in which the subset of the child applications includes the selections of the child applications and the selections of the features for the selected child applications.

Example 13 provides the method of example 12, in which different leads of the subscriber are associated with correspondingly different selections of the features.

Example 14 provides the method of example 12 or 13, in which: different subscribers are associated with corresponding branding elements, and lead portals associated with a common subscriber display common branding elements.

Example 15 provides the method of any one of examples 1-14, further including identifying the login credential as belonging to a lead of a subscriber to the third tier; retrieving lead data associated with the login credential; retrieving lead portal settings associated with the subscriber; and displaying the lead portal according to the lead portal settings and the lead data, in which: the lead portal settings include the subset of the child applications and branding elements associated with the subscriber, and the lead data includes activity history of the lead on the lead portal.

Example 16 provides non-transitory computer-readable tangible media that includes instructions for execution, which when executed by a processor of a computing device, is operable to perform operations including receiving a login credential at a lead portal displayed in a frontend of a parent application; and displaying a subset of child applications selected from a plurality of child applications on the lead portal, the subset being selected based on the login credential; in which: the parent application includes a tiered software framework having a first tier, a second tier and a third tier arranged according to hierarchical data access, with the first tier having the greatest access and the third tier having the least access to data of the parent application, the child applications are for mutually different purposes, the child applications are to use resources except data common across the first tier, the second tier and the third tier at a backend of the parent application, the child applications are to use data specific to the third tier, the backend is to execute remotely from the frontend over a cloud network, the login credential is of a lead associated with the third tier, and different login credentials are associated with correspondingly different subsets of the child applications.

Example 17 provides the non-transitory computer-readable tangible media of example 16, in which the resources include at least one of: microservices, documentation, program files, business logic, application programming interfaces (APIs), code, libraries, templates, virtual machines, computing hardware, plugins, network routing resources, and configuration files.

Example 18 provides the non-transitory computer-readable tangible media of example 16 or 17, in which: the second tier and the third tier have corresponding subscribers, and the login credential belongs to a lead of a subscriber to the third tier.

Example 19 provides the non-transitory computer-readable tangible media of example 18, in which: different subscribers to the third tier are associated with correspondingly different subsets of the child applications, and different leads of a common subscriber are associated with the same subset of the child applications.

Example 20 provides the non-transitory computer-readable tangible media of any one of examples 16-19, in which each child application includes one or more user interface (UI) features providing a corresponding functionality.

Example 21 provides the non-transitory computer-readable tangible media of example 20, in which the UI features are displayed according to respective settings associated with login credentials of individual users of the lead portal.

Example 22 provides the non-transitory computer-readable tangible media of example 20, in which the UI features are displayed according to respective settings associated with login credentials of subscribers to the third tier.

Example 23 provides the non-transitory computer-readable tangible media of any one of examples 16-22, in which each of first tier, the second tier and the third tier is associated with a separate surface providing different functionalities.

Example 24 provides the non-transitory computer-readable tangible media of any one of examples 16-23, in which the child applications relate to lead management.

Example 25 provides the non-transitory computer-readable tangible media of example 24, in which the child applications include: communities, e-commerce, course, affiliate manager, appointments, subscriptions, credit card management, document management, and accounting and billing.

Example 26 provides the non-transitory computer-readable tangible media of any one of examples 16-25, in which: access to the first tier enables access to at least portions of the first tier, the second tier and the third tier, access to the second tier enables access to at least portions of the second tier and the third tier, but not to the first tier, and access to the third tier enables access to portions of the third tier, but not to the first tier or to the second tier.

Example 27 provides the non-transitory computer-readable tangible media of any one of examples 16-26, in which the operations further include receiving another login credential at the lead portal; identifying the another login credential as belonging to a subscriber to the third tier; retrieving subscriber data of the subscriber; displaying the plurality of child applications on the lead portal for selection by the subscriber; receiving and storing selections of the child applications; receiving and storing selections of features for each selected child application; and receiving and storing branding elements for the lead portal associated with the subscriber, in which the subset of the child applications includes the selections of the child applications and the selections of the features for the selected child applications.

Example 28 provides the non-transitory computer-readable tangible media of example 27, in which different leads of the subscriber are associated with correspondingly different selections of the features.

Example 29 provides the non-transitory computer-readable tangible media of example 27 or 28, in which: different subscribers are associated with corresponding branding elements, and lead portals associated with a common subscriber display common branding elements.

Example 30 provides the non-transitory computer-readable tangible media of any one of examples 16-29, in which the operations further include identifying the login credential as belonging to a lead of a subscriber to the third tier; retrieving lead data associated with the login credential; retrieving lead portal settings associated with the subscriber; and displaying the lead portal according to the lead portal settings and the lead data, in which: the lead portal settings include the subset of the child applications and branding elements associated with the subscriber, and the lead data includes activity history of the lead on the lead portal.

Example 31 provides an apparatus including a processing circuitry; a memory storing data; and a communication circuitry, in which the processing circuitry executes instructions associated with the data, the processing circuitry is coupled to the communication circuitry and the memory, and the processing circuitry and the memory cooperate, such that the apparatus is configured for: receiving a login credential at a lead portal displayed in a frontend of a parent application; and displaying a subset of child applications selected from a plurality of child applications on the lead portal, the subset being selected based on the login credential; in which: the parent application includes a tiered software framework having a first tier, a second tier and a third tier arranged according to hierarchical data access, with the first tier having the greatest access and the third tier having the least access to data of the parent application, the child applications are for mutually different purposes, the child applications are to use resources except data common across the first tier, the second tier and the third tier at a backend of the parent application, the child applications are to use data specific to the third tier, the backend is to execute remotely from the frontend over a cloud network, the login credential is of a lead associated with the third tier, and different login credentials are associated with correspondingly different subsets of the child applications.

Example 32 provides the apparatus of example 31, in which the resources include at least one of: microservices, documentation, program files, business logic, application programming interfaces (APIs), code, libraries, templates, virtual machines, computing hardware, plugins, network routing resources, and configuration files.

Example 33 provides the apparatus of example 31 or 32, in which: the second tier and the third tier have corresponding subscribers, and the login credential belongs to a lead of a subscriber to the third tier.

Example 34 provides the apparatus of example 33, in which: different subscribers to the third tier are associated with correspondingly different subsets of the child applications, and different leads of a common subscriber are associated with the same subset of the child applications.

Example 35 provides the apparatus of any one of examples 31-34, in which each child application includes one or more user interface (UI) features providing a corresponding functionality.

Example 36 provides the apparatus of example 35, in which the UI features are displayed according to respective settings associated with login credentials of individual users of the lead portal.

Example 37 provides the apparatus of example 35, in which the UI features are displayed according to respective settings associated with login credentials of subscribers to the third tier.

Example 38 provides the apparatus of any one of examples 31-37, in which each of first tier, the second tier and the third tier is associated with a separate surface providing different functionalities.

Example 39 provides the apparatus of any one of examples 31-38, in which the child applications relate to lead management.

Example 40 provides the apparatus of example 39, in which the child applications include: communities, e-commerce, course, affiliate manager, appointments, subscriptions, credit card management, document management, and accounting and billing.

Example 41 provides the apparatus of any one of examples 31-40, in which: access to the first tier enables access to at least portions of the first tier, the second tier and the third tier, access to the second tier enables access to at least portions of the second tier and the third tier, but not to the first tier, and access to the third tier enables access to portions of the third tier, but not to the first tier or to the second tier.

Example 42 provides the apparatus of any one of examples 31-41, further configured for: receiving another login credential at the lead portal; identifying the another login credential as belonging to a subscriber to the third tier; retrieving subscriber data of the subscriber; displaying the plurality of child applications on the lead portal for selection by the subscriber; receiving and storing selections of the child applications; receiving and storing selections of features for each selected child application; and receiving and storing branding elements for the lead portal associated with the subscriber, in which the subset of the child applications includes the selections of the child applications and the selections of the features for the selected child applications.

Example 43 provides the apparatus of example 42, in which different leads of the subscriber are associated with correspondingly different selections of the features.

Example 44 provides the apparatus of example 42 or 43, in which: different subscribers are associated with corresponding branding elements, and lead portals associated with a common subscriber display common branding elements.

Example 45 provides the apparatus of any one of examples 31-44, further configured for: identifying the login credential as belonging to a lead of a subscriber to the third tier; retrieving lead data associated with the login credential; retrieving lead portal settings associated with the subscriber; and displaying the lead portal according to the lead portal settings and the lead data, in which: the lead portal settings include the subset of the child applications and branding elements associated with the subscriber, and the lead data includes activity history of the lead on the lead portal.

The above description of illustrated implementations of the disclosure, including what is described in the abstract, is not intended to be exhaustive or to limit the disclosure to the precise forms disclosed. While specific implementations of, and examples for, the disclosure are described herein for illustrative purposes, various equivalent modifications are possible within the scope of the disclosure, as those skilled in the relevant art will recognize.

The invention claimed is:

1. A method for facilitating a lead portal with unified login for child applications in a tiered software framework, the method comprising:
   receiving a login credential at a lead portal displayed in a frontend of a parent application in a tiered software framework, wherein:
      the tiered software framework comprises at least a first tier associated with a software provider, a second tier associated with an agency subscribed to the software provider, a third tier associated with a business subscribed to the agency, and a fourth tier associated with an end-user of the business, and
      computing resources of the parent application are hosted at the first tier, and are commonly accessible to the first tier, the second tier, the third tier and the fourth tier;
   associating the login credential with the end-user;
   retrieving settings of the lead portal, wherein:
      the settings are selected and assigned by the business, the settings comprise:
         a first subset of child applications selected by the business from a plurality of child applications that are made available to the business by the agency; and
         a second subset of features of each child application in the first subset,
      the child applications have access to all the computing resources of the parent application,
      the child applications have access to a third subset of data of the parent application, and
      the third subset of data is associated with the login credential and the business; and
   displaying the first subset of child applications with the second subset of features according to the third subset of data on the lead portal.

2. The method of claim 1, wherein:
   the second tier and the third tier have corresponding subscribers comprising agencies and businesses, respectively.

3. The method of claim 2, wherein:
   different businesses are associated with correspondingly different subsets of the child applications, and
   different end-users of a common business access to a common subset of the child applications.

4. The method of claim 1, wherein the child applications relate to lead management.

5. The method of claim 4, wherein the child applications include: communities, e-commerce, course, affiliate manager, appointments, subscriptions, credit card management, document management, and accounting and billing.

6. The method of claim 1, wherein:
   access to the first tier enables access to at least portions of the first tier, the second tier and the third tier,
   access to the second tier enables access to at least portions of the second tier and the third tier, but not to the first tier, and
   access to the third tier enables access to portions of the third tier, but not to the first tier or to the second tier.

7. The method of claim 1, further comprising:
   receiving another login credential at the lead portal;
   identifying the another login credential as belonging to the business;
   retrieving subscriber data of the business, the subscriber data indicating the plurality of child applications made available by the agency;
   displaying the plurality of child applications on the lead portal for selection by the subscriber business;
   receiving and storing selections of the child applications;
   receiving and storing selections of features for each selected child application; and
   receiving and storing branding elements for the lead portal associated with the business.

8. The method of claim 7, wherein different end-users of the business are associated by the business with correspondingly different selections of the features.

9. The method of claim 1, wherein the settings further comprise branding elements of the business, the method further comprising: displaying the branding elements on the lead portal.

10. Non-transitory computer-readable tangible media that includes instructions for execution, which when executed by a processor of a computing device, is operable to perform operations comprising:
   receiving a login credential at a lead portal displayed in a frontend of a parent application in a tiered software framework, wherein:
      the tiered software framework comprises at least a first tier associated with a software provider, a second tier associated with an agency subscribed to the software provider, a third tier associated with a business subscribed to the agency, and a fourth tier associated with an end-user of the business, and
      computing resources of the parent application are hosted at the first tier, and are commonly accessible to the first tier, the second tier, the third tier and the fourth tier;
   associating the login credential with the end-user;
   retrieving settings of the lead portal, wherein:
      the settings are selected and assigned by the business, the settings comprise:
         a first subset of child applications selected by the business from a plurality of child applications that are made available to the business by the agency; and
         a second subset of features of each child application in the first subset,
      the child applications have access to all the computing resources of the parent application,
      the child applications have access to a third subset of data of the parent application, and
      the third subset of data is associated with the login credential and the business; and
   displaying the first subset of child applications with the second subset of features according to the third subset of data on the lead portal.

11. The non-transitory computer-readable tangible media of claim 10, wherein:
the second tier and the third tier have corresponding subscribers comprising agencies and businesses, respectively,.

12. The non-transitory computer-readable tangible media of claim 11, wherein:
different businesses are associated with correspondingly different subsets of the child applications, and
different end-users of a common business have access to a common subset of the child applications.

13. The non-transitory computer-readable tangible media of claim 10, wherein:
access to the first tier enables access to at least portions of the first tier, the second tier and the third tier,
access to the second tier enables access to at least portions of the second tier and the third tier, but not to the first tier, and
access to the third tier enables access to portions of the third tier, but not to the first tier or to the second tier.

14. The non-transitory computer-readable tangible media of claim 10, wherein the operations further comprise:
receiving another login credential at the lead portal;
identifying the another login credential as belonging to the business;
retrieving subscriber data of the business, the subscriber data indicating the plurality of child applications made available by the agency;
displaying the plurality of child applications on the lead portal for selection by the business;
receiving and storing selections of the child applications;
receiving and storing selections of features for each selected child application; and
receiving and storing branding elements for the lead portal associated with the business.

15. The non-transitory computer-readable tangible media of claim 10, wherein the settings further comprise branding elements of the business, and the operations further comprise:
displaying the branding elements on the lead portal.

16. An apparatus comprising:
a processing circuitry;
a memory storing data; and
a communication circuitry, wherein the processing circuitry executes instructions associated with the data, the processing circuitry is coupled to the communication circuitry and the memory, and the processing circuitry and the memory cooperate, such that the apparatus is configured for:
receiving a login credential at a lead portal displayed in a frontend of a parent application in a tiered software framework, wherein:
the tiered software framework comprises at least a first tier associated with a software provider, a second tier associated with an agency subscribed to the software provider, a third tier associated with a business subscribed to the agency, and a fourth tier associated with an end-user of the business, and
computing resources of the parent application are hosted at the first tier, and are commonly accessible to the first tier, the second tier, the third tier and the fourth tier;
associating the login credential with the end-user;
retrieving settings of the lead portal, wherein:
the settings are selected and assigned by the business,
the settings comprise:
a first subset of child applications selected by the business from a plurality of child applications that are made available to the business by the agency; and
a second subset of features of each child application in the first subset,
the child applications have access to all the computing resources of the parent application,
the child applications have access to a third subset of data of the parent application, and
the third subset of data is associated with the login credential and the business; and
displaying the first subset of child applications with the second subset of features according to the third subset of data on the lead portal.

17. The apparatus of claim 16, wherein:
the second tier and the third tier have corresponding subscribers comprising agencies and businesses, respectively.

18. The apparatus of claim 17, wherein:
different businesses are associated with correspondingly different subsets of the child applications, and
different end-users of a common business have access to a common subset of the child applications.

19. The apparatus of claim 16, wherein:
access to the first tier enables access to at least portions of the first tier, the second tier and the third tier,
access to the second tier enables access to at least portions of the second tier and the third tier, but not to the first tier, and
access to the third tier enables access to portions of the third tier, but not to the first tier or to the second tier.

20. The apparatus of claim 16, wherein the settings further comprise branding elements of the business, and the apparatus is further configured for: displaying the branding elements on the lead portal.

* * * * *